United States Patent [19]

Matsuoka et al.

[11] Patent Number: 5,040,629
[45] Date of Patent: Aug. 20, 1991

[54] MOTOR-DRIVEN POWER STEERING APPARATUS

[75] Inventors: Hirofumi Matsuoka; Hidetoshi Tabuse, both of Osaka, Japan

[73] Assignee: Koyo Seiko Co., Ltd., Osaka, Japan

[21] Appl. No.: 524,376

[22] Filed: May 15, 1990

[30] Foreign Application Priority Data

| May 17, 1989 | [JP] | Japan | 1-126336 |
| Jul. 28, 1989 | [JP] | Japan | 1-197676 |
| Jul. 28, 1989 | [JP] | Japan | 1-197677 |

[51] Int. Cl.⁵ ............................................. B62D 5/04
[52] U.S. Cl. ................................. 180/79.1; 180/141; 364/424.05
[58] Field of Search ................. 180/79.1, 141, 142, 180/143; 364/424.05, 424.1

[56] References Cited

U.S. PATENT DOCUMENTS

| 4,657,103 | 4/1987 | Shimizu | 180/79.1 X |
| 4,715,463 | 12/1987 | Shimizu | 180/142 X |
| 4,730,686 | 3/1988 | Shimizu | 180/79.1 |
| 4,753,308 | 6/1988 | Noto et al. | |
| 4,819,170 | 4/1989 | Shimizu | 180/142 X |
| 4,961,474 | 10/1990 | Daido et al. | 180/79.1 |

FOREIGN PATENT DOCUMENTS

| 3711099A | 10/1988 | Fed. Rep. of Germany . | |
| 62-55265 | 3/1987 | Japan . | |
| 0244760 | 10/1987 | Japan | 180/79.1 |
| 2094730A | 9/1982 | United Kingdom . | |
| 2188890 | 10/1987 | United Kingdom | 180/79.1 |

Primary Examiner—Charles A. Marmor
Assistant Examiner—Kevin Hurley
Attorney, Agent, or Firm—Darby & Darby

[57] ABSTRACT

A motor-driven power steering apparatus comprising a steering assisting motor, a torque sensor detecting steering torque, a vehicle speed sensor, and a steering angular velocity detecting unit detecting steering angular velocity of steering mechanism. The power steering apparatus sets the value of current to be delivered to the steering assisting motor in correspondence with the detected steering torque and vehicle speed. The power steering apparatus sets the current value to be 0 when the steering torque remains in the dead zone in which the steering torque value is less than the first predetermined value. If the steering torque is more than the first predetermined value and less than the second predetermined value, the current value is set to increase as the steering torque value increases. If the steering torque is in excess of the second predetermined value, the growth rate of the current value against the steering torque is set to diminish as the vehicle speed rises. Further, the apparatus sets the subtraction current of which value increases as the detected steering angular velocity and the vehicle speed increases, and then subtracts the subtraction current from the set current value, transmitting the substracted result to the motor. Since the value of the subtraction current grows when the vehicle runs fast and a small value of current is set, only a small amount of current flows through the motor.

11 Claims, 17 Drawing Sheets

MOTOR-DRIVEN POWER STEERING APPARATUS

BACKGROUND OF THE INVENTION

1. Field of the Invention

The present invention relates to a motor-driven power steering apparatus which assists power required for steering operation by applying rotating force of the motor, more particularly, it relates to a power steering apparatus responsive to the vehicle speed.

2. Description of Related Art

There is such a conventional motor-driven power steering apparatus which drives a steering-assisting motor based on the result of detecting steering torque applied to the steering wheel and which assists the power required for steering of the vehicle by rotating force of the motor so that the driven can enjoy comfortable steering torque.

This conventional power steering is composed of a rack shaft which is installed by way of extending itself in the left and right directions of the vehicle body and which has both ends connected to the left and right wheels respectively through respective tie-rods and of a pinion which is engaged with the middle of the rack shaft and interlinked to the steering wheel.

There are those vehicles comprising rack/pinion steering mechanism performing steering operation by converting rotation of the pinion relative to the rotational operation of the steering wheel into the movement in the lengthwise direction of the rack shaft. These vehicles are classified into two categories according to the disposed position of the steering assisting motor. That is, in one vehicle the pinion shaft is further extended from the rack-shaft-engaged position and the steering assisting motor is installed so that the rotating force can be transmitted to the extended portion of the pinion shaft through an adequate reduction gear unit. In the other, an auxiliary pinion engaged with the rack shaft at a position in the direction of the shaft length apart from the above rack-shaft-engaged position and the steering assisting motor is installed so that the rotating force can be transmitted to the auxiliary pinion through an adequate reduction gear unit. Based on the number of pinions engaged with the rack shaft, conventionally, the former is called "single pinion" type and the latter "double pinion" type, respectively.

In operating the conventional power steering apparatus cited above, since reeling sense accompanies the steering sense at a high speed running, this conventional power steering apparatus controlled to diminish the steering assisting force in correspondence with the accelerated speed by making the steering assisting force respond to the vehicle speed so that the reeling sense can be suppressed.

Nevertheless, even in either of above-mentioned two types of the conventional power steering apparatus, since the rotating force of the steering assisting motor is transmitted to the extended portion of the pinion shaft or the auxiliary pinion through the reduction gear unit, when the driver operates the steering wheel and then returns it at a high speed running, the steering wheel may excessively turn itself due to inertia force of the steering assisting motor, thus generating sense of awkwardness of steering operation.

SUMMARY OF THE INVENTION

The invention has been achieved to solve the above problem. The primary object of the invention is to provide a novel power steering apparatus which securely suppresses the reeling sense and awkward sense of steering operation at a high speed running caused by inertia force of a steering assisting motor, by executing subtraction control for subtracting the values corresponding to the steering angular velocity and the vehicle speed from the target value of current to be delivered to the steering assisting motor.

Another object of the invention is to provide a novel power steering apparatus which suppresses the uncontinous sense of steering operation generated around the dead zone of the torque in executing subtraction control, by subtracting the values set corresponding to the angular velocity of the steering rotation and the vehicle speed respectively from the detected value of torque given to the steering wheel and the target value of current to be delivered to the steering assisting motor.

The still further object of the invention is to provide a novel power steering apparatus which is capable of providing stable steering operation in operating the steering wheel finely at the high speed running and natural steering sense because of a wide adjusting range of steering sense, by providing the steering wheel with false dynamic friction when the steering angular velocity exceeds a predetermined value by incrementing in correspondence with the vehicle speed a value to be subtracted according to the steering angular velocity and the vehicle speed respectively from the detected value of torque given to the steering wheel and the target value of current to be delivered to the steering assisting motor.

The above and further objects and features of the invention will more fully be apparent from the following detailed description with accompanying drawings.

DESCRIPTION OF THE PREFERRED EMBODIMENTS

Figure 1:
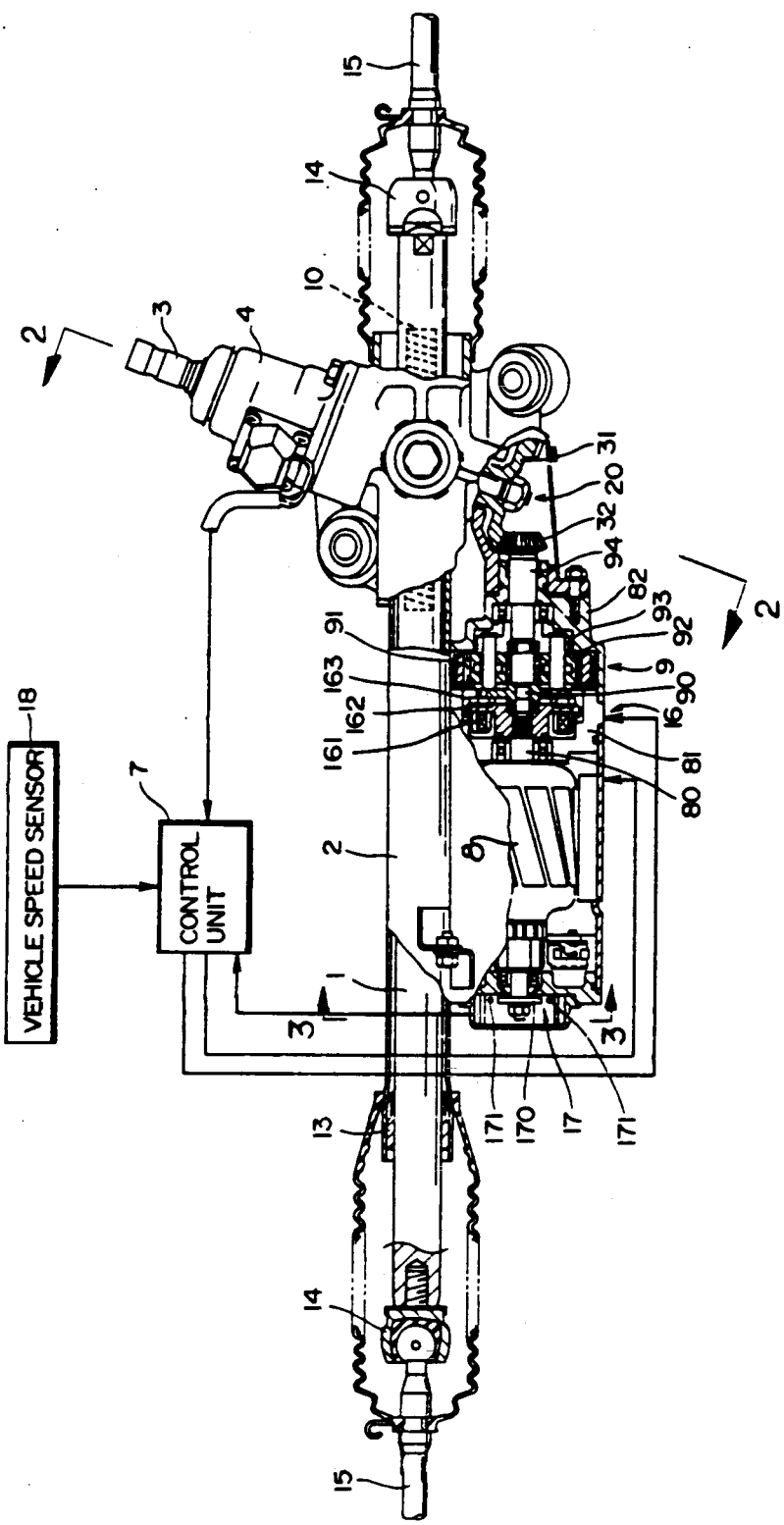
FIG. 1 illustrates the partially exploded front view of the single pinion power steering apparatus reflecting an embodiment of the invention.

The present invention will be described referring to the drawings showing embodiments thereof.

In FIG. 1, reference numeral 1 designates a rack shaft inserted concentrically within a cylindrical rack shaft case 2 fixed at a part of a vehicle body with its longitudinal direction as right-left direction. Numeral 3 is a pinion shaft supported rotatably in the state that the shaft center thereof intersects obliquely against the rack shaft 1 at the inside of a pinion shaft case 4 connected following the vicinity of one end portion of the rack shaft 2.

Figure 2:
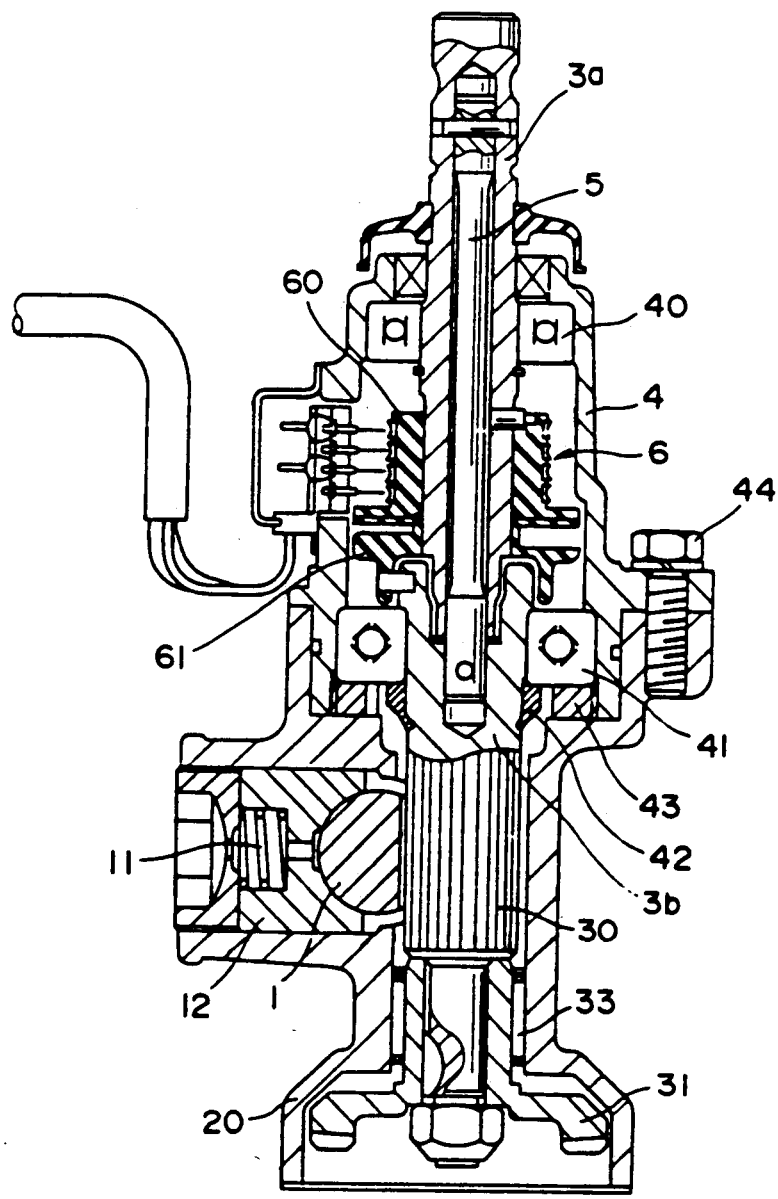
FIG. 2 illustrates the enlarged section view of the power steering apparatus across the line 2 through 2 shown in FIG. 1.
Figure 3:
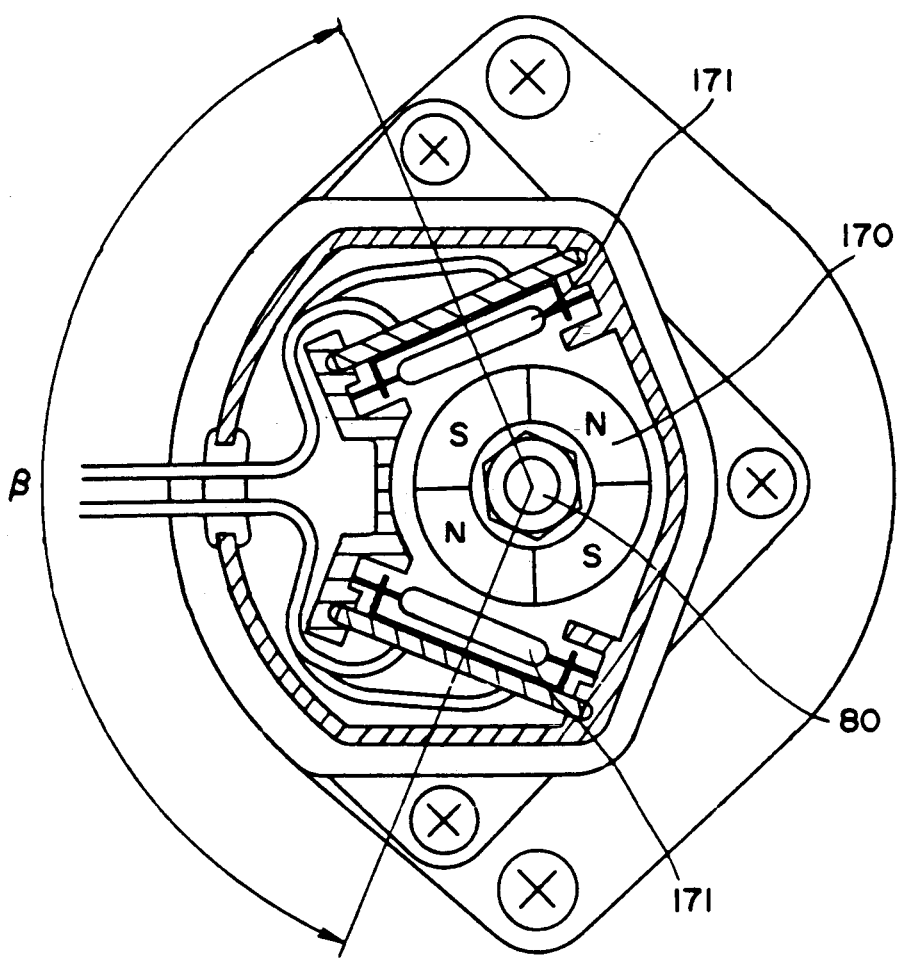
FIG. 3 illustrates the enlarged sectional view of the structure of the rotary detector across the line 3 through 3 shown in FIG. 1.

The pinion shaft 3, as shown in FIG. 2, consists of an upper shaft 3a and a lower shaft 3b connected coaxially with each other through a torsion bar 5, the upper shaft 3a being supported inside of the pinion shaft case 4 by a ball bearing 40 with its upper end portion interlockingly combined to a steering wheel through a universal joint not shown. And the lower shaft 3b at the neighborhood position of the upper end portion is supported inside of the pinion shaft case 4 by a four-point contact ball bearing 41 in the state that the proper length of the under portion thereof is projected from a downside opening of the pinion shaft case 4. The four-point contact ball bearing 41 is fitted from outside to the lower shaft 3b from lower end portion side, and is positioned outside of the lower shaft 3b in the axial direction with both sides of the inner ring being held, by steps formed in the vicinity of the upper end portion of the lower shaft 3b and collar 42 fixed from outside from the lower end portion side and caulked to the peripheral surface. Then, it is fitted into the pinion shaft case 4 together with the lower shaft 3b from aforementioned downside opening, and is positioned inside of the pinion shaft case 4 in the axial direction with both sides of the outer ring being held, by a circular shoulder part formed at the lower part of the case 4 and a lock nut 43 screwed to the case 4 from the opening, and loads radial load acting upon the lower shaft 3b and axial load of both directions.

At the middle portion of the lower shaft 3b projected from the pinion shaft case 4, pinion teeth 30 in an appropriate length are formed in the axial direction thereof. In the case where the pinion shaft case 4 is fixed at the upper side of aforesaid rack shaft case 2 by fixing bolts 44, the pinion teeth 30 engage with rack teeth 10 formed at a position a little close to one end portion of the rack shaft 1 in the axial direction thereof in an appropriate length inside of the rack shaft case 2, making the lower shaft 3b with the rack shaft 1 engage, with their shaft centers intersect obliquely with each other. The lower shaft 3b is extended downward further from the position of engagement with the rack shaft 1, a big bevel gear 31 with the teeth-formed face thereof tilting downward being fittedly mounted coaxially with the lower shaft 3b at the lower end portion thereof. The lower shaft 3b is supported by a needle roller bearing 33 in a bevel gear housing 20 connected following the downside of the rack shaft case 2 in the state of surrounding the big bevel gear 31. Accordingly, the lower shaft 3b is supported at both sides of the position of engagement of the rack teeth 10 with the pinion teeth 30 by the four-point contact ball bearing 41 and the needle roller bearing 33, thereby flexing quantity of the lower shaft 3b at the position of engagement being kept within the predetermined tolerance.

Still more, at the position of engagement of the rack teeth 10 with the pinion teeth 30, a rack guide 12 for pressing the rack shaft 1 by biasing force of a pressing spring 11 forward the pinion shaft 3 is provided so that the rack teeth 10 and the pinion teeth 30 can be engaged without any gap. The rack shaft 1 is, at the position of engagement, supported by the rack guide 12 and the lower shaft 3b in the state that it is held from both sides of radial direction as well as it is supported by a bearing bush 13 fitted into an end portion of the rack shaft case 2 opposite to the connected position of the pinion shaft case 4 with itself, it being movable freely in its axial direction inside of the rack shaft case 2. Both right and left end portions of the rack shaft 1 projected respectively at both sides of the rack shaft case 2 are connected to tie rods 15, 15 stretching respectively to the right and left wheels not shown through respective ball and socket joints 14, 14, the wheels being steered to right or left according to the movement of the rack shaft 1 in the axial direction thereof.

In FIG. 2, reference numeral 6 designates a torque sensor for detecting steering torque exerted on the steering wheel. The torque sensor 6 uses a potentiometer comprising a resistance holding member 60 which is outfitted to the upper shaft 3a, rotates therewith, and at the downside end surface, forms a circular resistance with the shaft center of the upper shaft 3a being the center, and a detecting piece holding member 61 which is outfitted to the lower shaft 3b, rotates therewith and, at the upside end surface forms a detecting piece which slidely-contact to a point in a radial direction on the resistance. The upper shaft 3a of the pinion shaft 3 rotates around the axial shaft according to the rotation of the steering wheel, however, road surface resistance acting upon the wheels acts upon the lower shaft 3b through the rack shaft 1, thereby, torsion corresponding to the steering torque exerted on the steering wheel is produced at a torsion bar 5 interposed between the two shafts. The torque sensor 6 outputs relative displacement in the circumferential direction created between the upper shaft 3a and the lower shaft 3b accompanying the torsion of the torsion bars 5, as a potential corresponding to slidely contact position of the detecting piece with the resistance and in the case where the torsion is not created at the torsion bar 5, in other words, in the case where the steering operation is not performed, it is initialized so as to output the specified reference potential. The output signal of the torque sensor 6 is inputted in time order to a control unit 7 which compares the signal with the reference potential to recognize the direction and strength of the steering torque, then generates a driving signal to a steering assisting motor 8 provided in such a way as described later.

The motor 8 is to transmit the turning force thereof to aforementioned lower shaft 3b through an electromagnetic clutch 16, epicycle reduction gear 9 and small bevel gear 32 which engages with the big bevel gear 31 and is smaller than the big bevel gear 31 in diameter.

The electromagnetic clutch 16 consists of a coil unit 161 which is annular in shape and fixed to a middle case 81 of the motor 8, a moving unit 162 which is outfitted at one side of a rotation axis 80 of the motor 8 coaxially therewith and rotates with the rotation axis 80, and an engaging part 163 which is discoid in shape, faces the moving unit 162 and engages with the moving unit 162 by electromagnetic force caused by power supply to the coil unit 161, performing engaging and disengaging of turning force of the motor 8.

The epicycle reduction gear 9 consists of a sun shaft 90 which is fitted into the engaging part 163, rotates and has a sun gear supported at one end thereof by a bearing fitted into the moving unit 162 and supported at the other end thereof by a bearing fitted into a planet carrier 93 to be described later, an outer ring 91 which is circular in shape and fixed to a casing end surface 82 of the motor 8 coaxially with the rotation axis 80, a plurality of planet gears 92, 92... which rotatably contacts with the inner surface of the outer ring 91 and with the outer surface of the sun gear of the sun shaft 90 respectively, autorotate around the shaft centers thereof respectively as well as revolve around the shaft center of the sun gear, and the planet carrier 93 which supports rotatably respective planet gears 92, 92.... The epicycle reduction gear 9 has a smaller outer diameter than that of the motor 8 and is integrated with the motor 8 and electromagnetic clutch 16 at one side of the rotation axis 80. An output shaft 94 of the epicycle reduction gear 9 is fitted into and fixed at a position of the shaft center of the planet carrier 93 which is positioned coaxially with the rotation axis 80 of the motor 8, and is projected in an appropriate length outside of the casing. At the tip portion of the output shaft 94, the small bevel gear 32 is fixedly mounted with its teeth-formed face turned toward the tip portion side, the small bevel gear 32 being constructed so as to rotate, together with the output shaft 94, corresponding to the revolution of the planet gears 92, 92....

The motor 8, electromagnetic clutch 16 and epicycle reduction gear 9 are fixed onto a blacket 2a provided outside of the rack shaft case 2, in the state that these shaft centers are approximately parallel to the shaft center of the rack shaft 1 and are fitted into the bevel gear housing 20 with the small bevel gear 32 being inside. And at the inside of the aforesaid housing 20, the small bevel gear 32 is engaged with the big bevel gear 31 fixedly mounted at the lower end portion of aforesaid lower shaft 3b. Backlash adjustment between the big bevel gear 31 and the small bevel gear 32, in fitting the epicycle reduction gear 9 into the bevel gear housing 20, can be performed easily by changing thickness and/or number of shims to be interposed at the abutting portion of the casing of the epicycle reduction gear 9 with the bevel gear housing 20.

Figure 4:
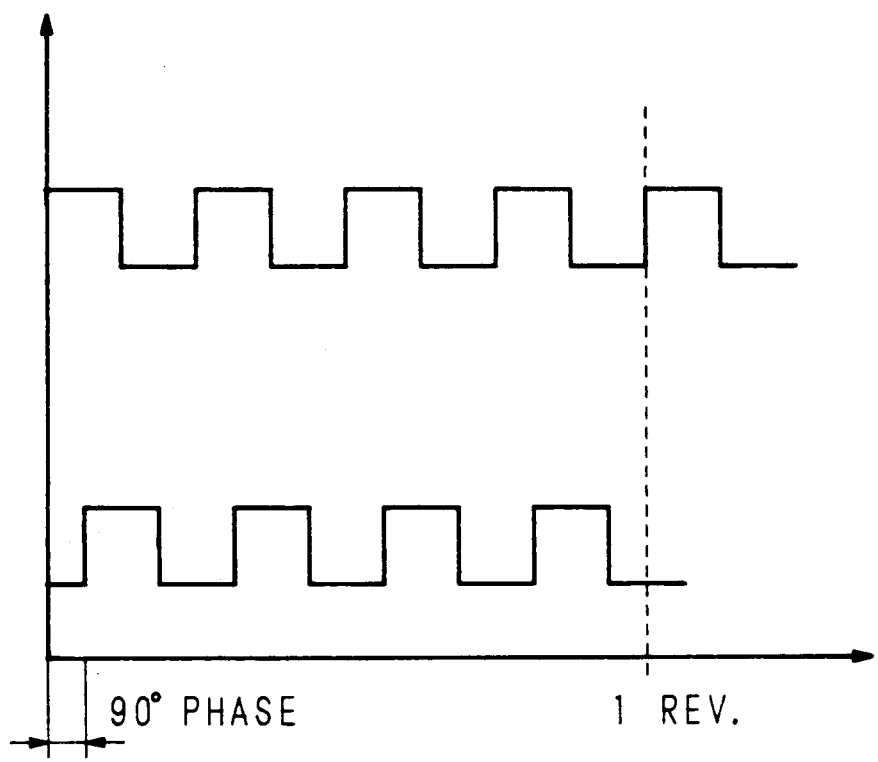
FIG. 4 illustrates the output waveforms from the rotation detecting unit.

And on the other side of the rotation axis 80 of the motor 8, a rotary detector 17 for detecting the rotational position of the motor 8 is provided. The rotary detector 17 consists of a magnet board 170 outfitted at the other side of the rotation axis 80 of the motor 8 and being discoid in shape, having two N-poles and two S-poles, and two reed switches 171, 171 fitted at a specified angle of incidence of $\beta$ (in the embodiment, $\beta = 135°$) around the magnet board 170. FIG. 4 is a waveform chart indicating an output waveform of the rotary detector 17. As the two reed switches 171, 171 are fitted at the angle of incidence $\beta$ being 135°, the output waveform is outputted with the phase deviating 90°. The rotary detector 17 has resolution of 1/16 of one rotation by detecting leading and trailing edges of respective four waveforms are outputted by one rotation.

The rotary detector 17, when compared with the conventional rotary detectors such as tachogenerator and the like, is capable of detecting from 0 number of rotation, thereby capable of detecting the relative position of a rotor. Still more, it is small-sized, has a great resistance to high temperature, has little aged deterioration and costs inexpensive, compared with a rotary encoder of a photointerrupter type. Still, as the output waveform becomes the pulse output, the detected result can be taken easily into CPU such as micro computer and the like.

Also in the control unit 7, the output signal of the rotary detector 17 and the output signal of a vehicle speed sensor 18 for detecting vehicle speed are inputted as well as the output signal of the torque sensor 6. In the control unit 7, the control to be described later is carried out and a driving signal for driving the motor 8 and the electromagnetic clutch 16 is outputted.

Figure 5:
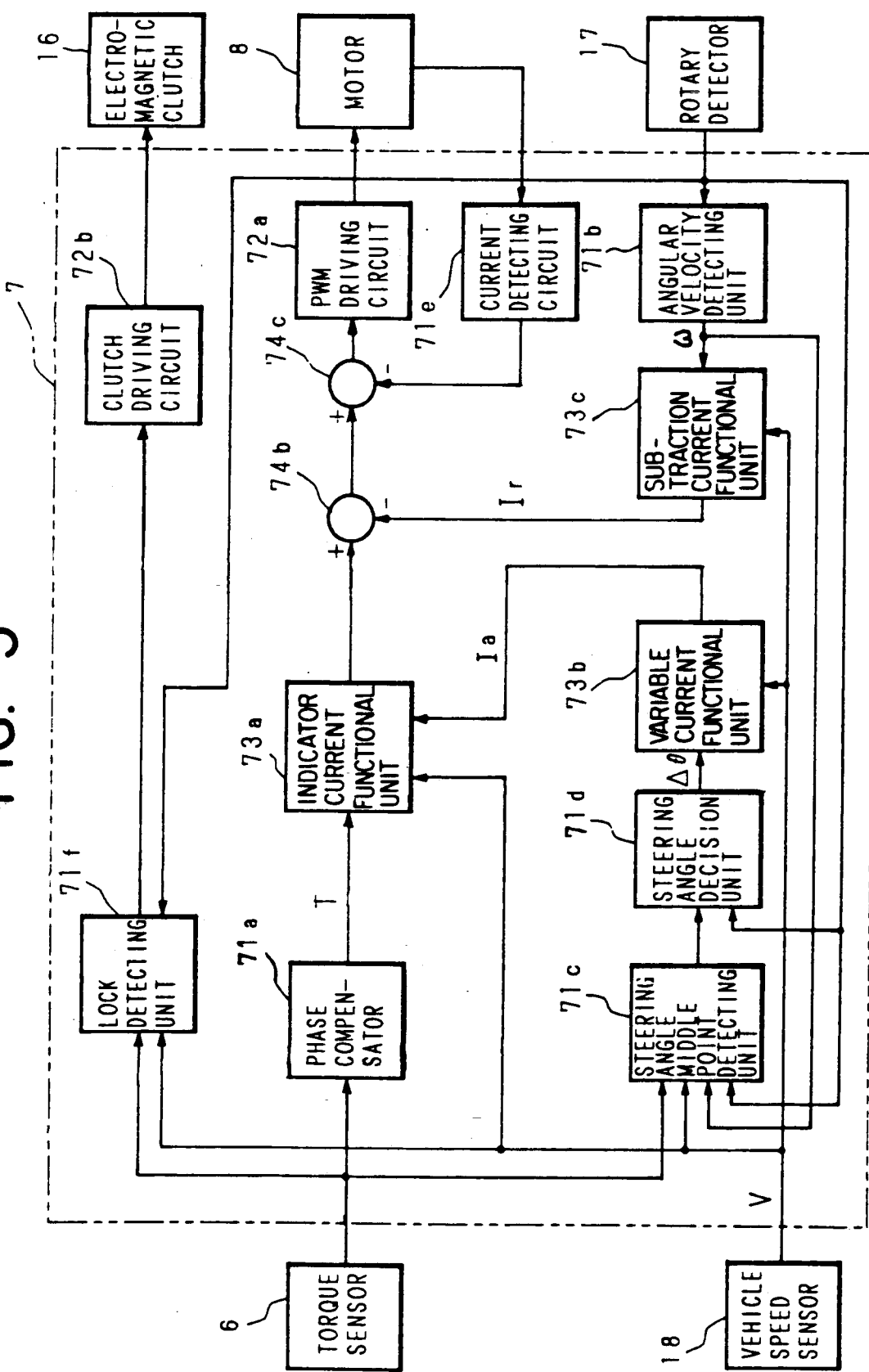
FIG. 5 illustrates the schematic block diagram designating the structure and operation of the control unit.

Next, control operation of the control unit 7 is described below. FIG. 5 illustrates the schematic block diagram designating the structure and control operation of the control unit 7. The control unit 7 is mainly composed of a microprocessor, and in addition, the control unit 7 comprises a drive circuit 72b of the electromagnetic clutch 16, a pulse width modulation (PWM) driving circuit 72a of the motor 8, and a current detecting circuit 71e, etc. Torque detecting signal outputted from the torque sensor 6 is inputted to a phase compensator 71a for forwarding the phase and stabilizing the system, a middle-point detecting unit 71c for determining the middle point of the steering angle of the steering mechanism, and a lock detecting unit 71f which detects locked condition of the motor 8, respectively. Vehicle speed detecting signal from the vehicle speed sensor 18 is transmitted to the lack detecting unit 71f, and indicator current functional unit 73a, the middle point detecting unit 71c, a variable current functional unit 73b, and a subtraction current functional unit 73c, respectively. Steering angle $\theta$ outputted from a steering angle decision unit 71d (to be described later on) is delivered to the variable current functional unit 73b, where the value of variable current Ia is determined in correspondence with the steering angle $\theta$ and the vehicle speed V to vary the characteristic of indicator current I. Steering angular velocity $\omega$ outputted from an angular velocity detecting circuit 71b (to be described later on) is transmitted to the subtraction current functional unit 73c to generate subtraction current Ir which diminishes the value of the indicator current I in correspondence with the angular velocity ω of the steering wheel and the vehicle speed V. Rotation detecting signal outputted from the rotary detector unit 17 is inputted to the lock detecting unit 71f, the middle point detecting unit 71c, the angular velocity detecting unit 71b, and the steering angle decision unit 71d, respectively. The steering angle decision unit 71d determines the steering angle Δθ based on the rotation detecting signal and the middle point data from the middle point detecting unit 71c.

Based on the inputted rotation detecting signal, vehicle speed detecting signal, and torque detecting signal, the lock detecting unit 71f detects the rotation of the motor 8 whenever the torque and the vehicle speed respectively exceed the predetermined values, and then, based on the detected number of the rotation of the motor 8, the lock detecting unit 71f detects whether the motor 8 is in the locked condition or the unlocked condition. Signal outputted from the lock detecting unit 71f is transmitted to the electromagnetic clutch 16 via the clutch driving circuit 72.

Signal ω outputted from the angular velocity detecting unit 71b is transmitted to the middle point detecting unit 71c and the subtraction current functional unit 73c. Signal outputted from phase compensator 71a, variable current Ia and vehicle speed V are respectively transmitted to the indicator current functional unit 73a which generates the indicator current I to be delivered to the motor 8.

Signal outputted from the indicator current functional unit 73a is inputted to a subtractor 74b, which subtracts the subtraction current Ir outputted from the subtraction current functional unit 73c, and then the result of this subtraction is delivered to a subtractor 74c.

The subtractor 74c subtracts feedback signal outputted from current detecting circuit 71e which has a current detecting resistor (not shown) inserted into the line of the motor 8 and detects the current consumed by the motor 8 from the result of the subtraction performed in the subtractor 74b. The result of the subtraction is delivered to the motor 8 via the PWM driving circuit 72a. The current detecting circuit 71e is so constructed to detect current including fly-wheel current of the motor 8 in order to stabilize current loop.

Figure 6:
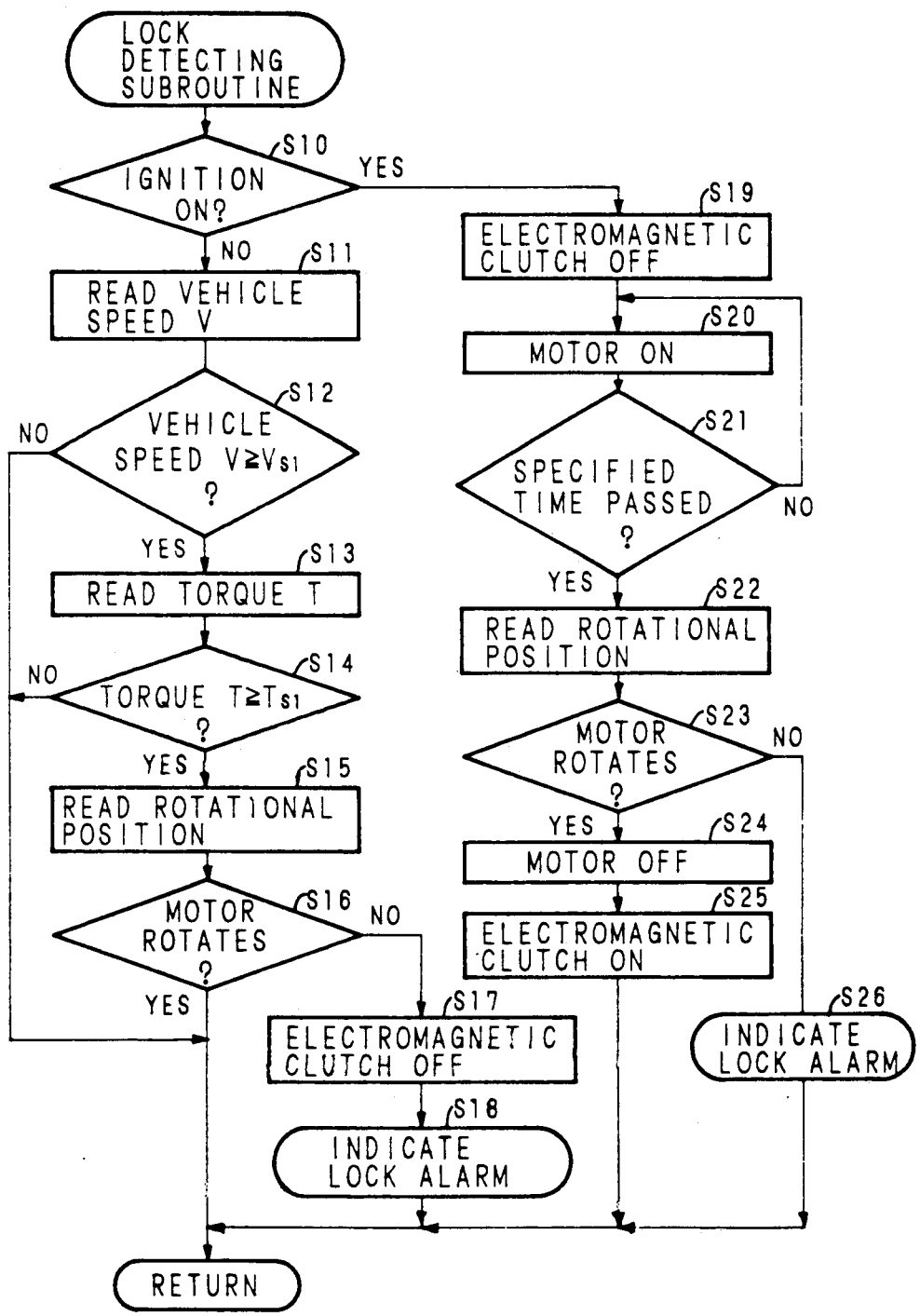
FIG. 6 presents the flow chart showing the control of lock detecting.

Next, flow of the control operation of the control unit 7 is described below. FIG. 6 presents the flow chart designating lock detecting control operation. First, in Step S10, it is determined whether or not it is a rising edge of a signal which is generated simultaneously with activation of ignition switch (not shown). If it is not the rising edge, in Step S11, the vehicle speed V detected by the vehicle speed sensor 18 is read. Next, in Step S12, it is determined whether or not the vehicle speed V is faster than the vehicle speed threshold value $V_{s1}$. If the vehicle speed V is faster, then, in Step S13, the steering torque T detected by the torque sensor 6 is read. Then, in Step S14, it is determined whether or not the steering torque T is greater than the torque threshold value $T_{s1}$. If the steering torque T is greater, then in Step S15, the rotational position of the motor 8 from the rotary detector 17 is read. Then, in Step S16, the control unit 7 determines whether the motor 8 rotates or not based on the value of the rotating position of the motor 8. If the motor 8 rotates, then operation mode returns. If the motor 8 does not rotate, then the control unit 7 determines that the motor 8 is locked. Then, in Step S17 electromagnetic clutch 16 is turned OFF to disengage the motor 8 from the epicyclic reduction gear 9 so that the steering mechanism can be freed from the motor 8. In the next Step S18, a lock alarm lamp (not shown) lights up, and then, operational mode returns.

On the other hand, if it is determined that it is the rising of the above signal in Step S10, the electromagnetic clutch 16 is turned OFF in Step S19 to allow the motor 8 to turn ON itself in the next Step S20. Next, in Step S21, the lapse of the predetermined time is determined. Then, in Step S22, the rotational position of the motor 8 detected by the rotary detector 17 is read. Then, in Step S23, it is determined whether the motor 8 rotates or not. If the motor 8 rotates, then, in Step S24 the motor 8 is turned OFF, and in Step S25, the electromagnetic clutch 16 is activated. If it is determined that the motor 8 does not rotate in Step S23, then, in Step S26, the lock alarm lamp lights up before operational mode returns.

Next, calculation of the middle point of the steering angle and operation for controlling return movement of steering wheel based thereon are described below.

Figure 7:
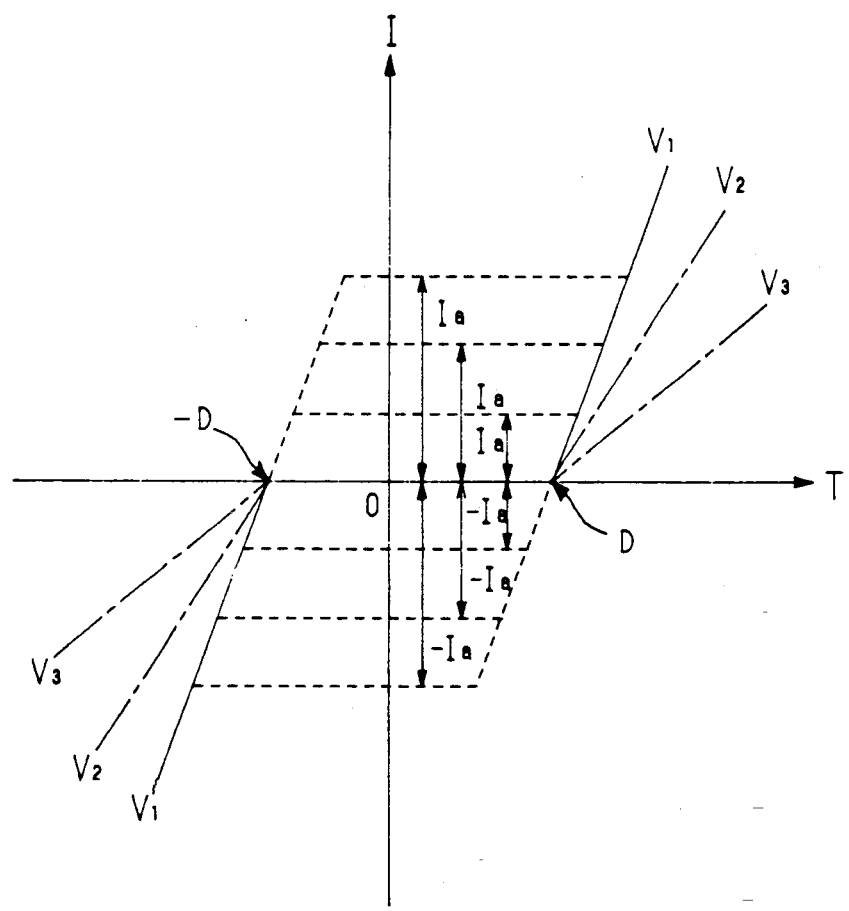
FIG. 7 presents graphic chart designating characteristic of the relationship between the indicator current of indicator current functional unit and the torque.

FIG. 7 presents a graphic chart designating characteristic of the relationship between the indicator current I of the indicator current functional unit 73a and torque T, in which the ordinate axis designates the indicator current I, and the abscissa axis designates the torque T. The positive side of the torque T along the abscissa axis designates torque when turning the steering wheel to the right. The negative side of the torque T along the abscissa axis designates torque when turning the steering wheel to the left. The positive side of the indicator current I along the ordinate axis designates current allowing the motor 8 to rotate so that the right turn steering can be performed. The negative side of the indicator current I designates current allowing the motor 8 to rotate so that the left turn steering can be performed.

One-dot chained lines designate characteristics of the relationship between the indicator current I and the torque T variable by the vehicle speed $V_1$, $V_2$, $V_3$. Broken lines designate the indicator current I to be delivered from the indicator current functional unit 73b to the motor 8 when returning the steering wheel. The indicator current I is varied by the variable current Ia which is determined based on the steering angle and the vehicle sped V at the moment of returning the steering wheel.

The area between −D and D designates dead zone, in which no steering assistance is delivered from the motor 8. If the steering torque T in the right or left direction exceeds the range of the dead zone −D through D as a result of the steering operation, the amount of the indicator current I flowing into the motor 8 increases as the torque T increases, thus resulting in the strengthened steering-assisting force from the motor 8. In this case, until the torque T reaches a predetermined low torque value $-T_s$ through $T_s$, the amount of the indicator current I grows independent of the inputted vehicle speed V. As soon as the torque T exceeds the predetermined low torque value, the relationship between the torque T and the indicator current I is dependent on the vehicle speed $V_1$, $V_2$, $V_3$ (where $V_1 < V_2 < V_3$). In consequence, the faster the vehicle speed V, the lower the amount of the indicator current I against the torque T.

When turning the steering wheel to the right or to the left and then returning it, if the torque T enters the dead zone −D through D, the variable current −Ia or Ia designated by the broken line is converted into the indicator current I. If the torque T still remains in the dead zone $-D$ through D, then the indicator current I is controlled by the variable current Ia so that the indicator current I can remain constant, thus allowing the motor 8 to be driven under constant torque. As a result, the steering assisting force remains constant when returning the steering wheel.

The absolute value of the variable current Ia increases as the value of vehicle speed V delivered to the variable current functional unit 73b decreases and the the steering angle $\Delta\theta$ expands. Consequently, more amount of the indicator current I flows as the vehicle speed V decreases. This in turn strengthens the return force of the steering wheel.

Figure 8:
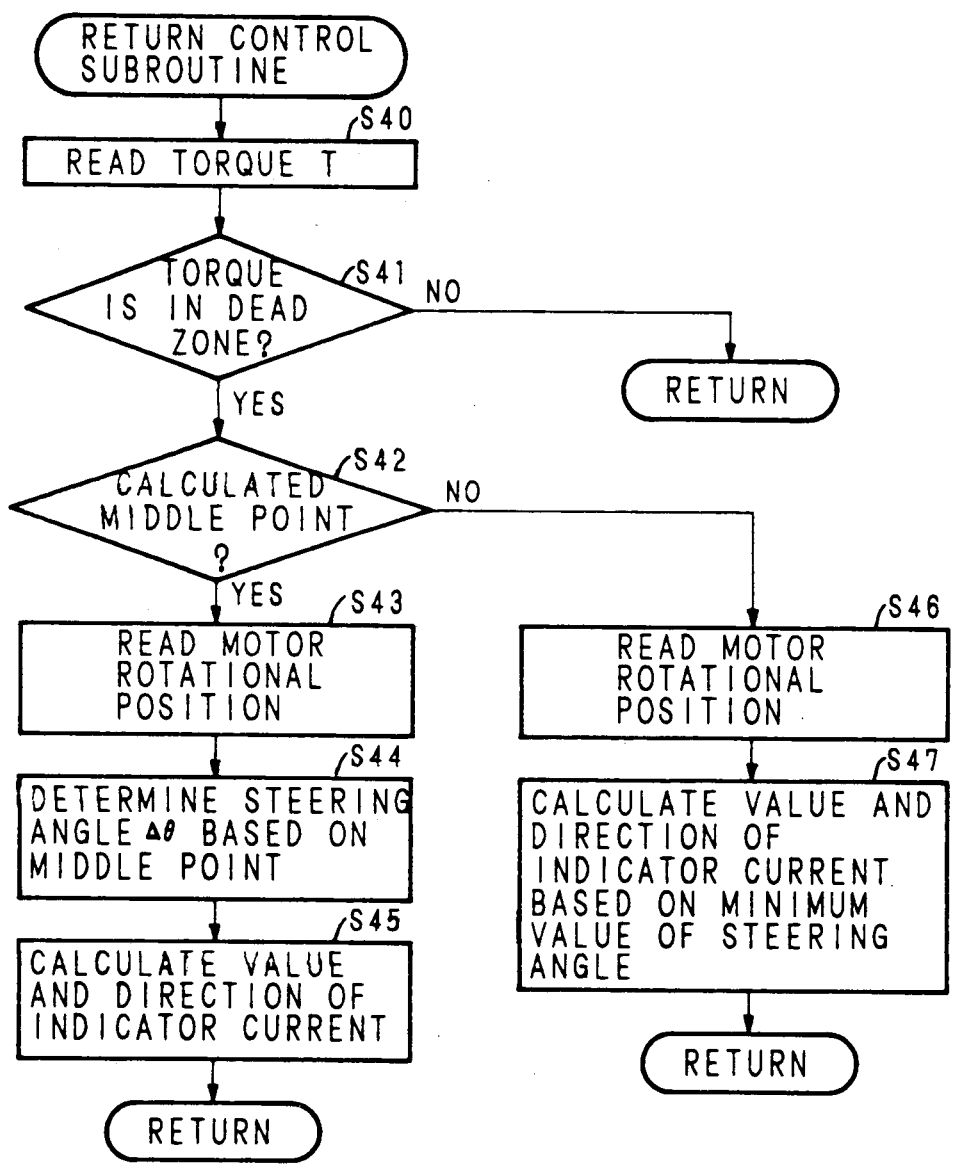
FIG. 8 presents the flow chart designating the return control of steering wheel.

FIG. 8 presents the flow chart designating the return control applied to the steering wheel.

First, in Step S40, the control unit 7 reads torque T, and then determines whether the torque T is in the dead zone, or not, in the following Step S41. If the torque T is outside the dead zone, then, the control unit 7 executes conventional motor-current control operation. In other words, value of the indicator current I is determined based on the detected torque T and vehicle speed V. If the torque T is in the dead zone, next in Step S42, it is determined whether the middle point calculation routine is completed, or not. If it is already completed, then in Step S43, the control unit 7 reads the rotational position of the motor 8 from the rotary detector 17. Then, in Step S44, the steering angle decision unit 71d determines the steering angle $\Delta\theta$ ($=\theta r - \theta m$) by referring to the relative steering angle $\theta r$ and the middle point $\theta m$ based on the detected rotational position of the motor 8.

When the steering angle $\theta$ is determined, then, in Step S45, the variable current functional unit 73b calculates the value of the variable current Ia by referring to the steering angle $\Delta\theta$ and the vehicle speed V and the indicator current functional unit 73a calculates the value and the direction of the indicator current I.

If calculation of the middle point is not yet completed in the course of Step S42, then, in Step S46, the control unit 7 reads the rotational position of the motor 8 from the rotary detector 17. Then, in Step S47, the control unit 7 calculates the value of the variable current Ia based on the minimum value of the steering angle determined by the routine for determing the left or right position of the steering wheel (this process is to be described later on), and then calculates the value and the direction of the indicator current I.

Figure 9:
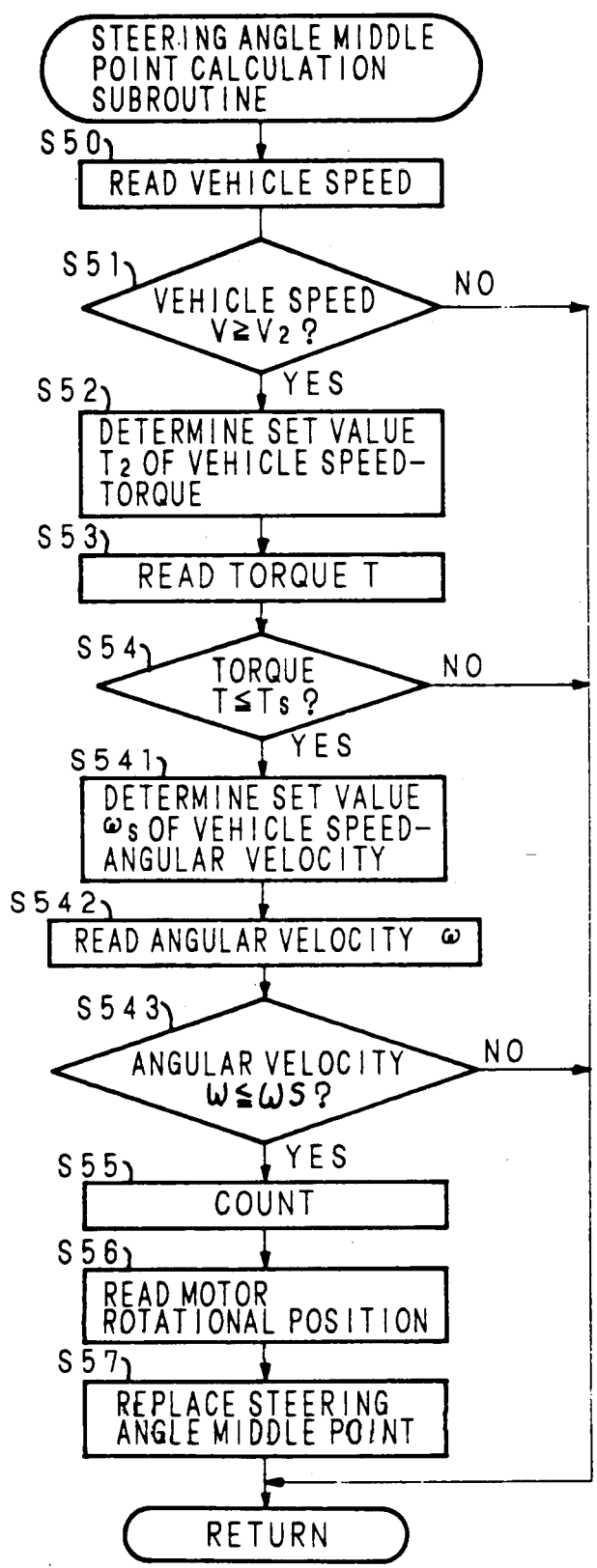
FIG. 9 presents the flow chart designating the method of calculating the middle point of the steering angle.

FIG. 9 presents the flow chart designating the routine for calculating the middle point of the steering angle. First, in Step S50, the control unit 7 reads the vehicle speed V. In Step S51, the control unit 7 determines whether the vehicle speed V is faster than the threshold value $V_{s2}$, or not. If the vehicle speed V exceeds the threshold value $V_{s2}$, then, in Step S52, the control unit 7 determines the set torque value $T_{s2}$ corresponding to the vehicle speed V. Next, in Step S53, the control unit 7 reads the torque T, and in Step S54 determines whether the value of torque T is less than the set torque value $T_{s2}$, or not. If the value of torque T is less than the set torque value $T_{s2}$, in Step S541, the control unit 7 determines the set angular velocity value $\omega_s$ corresponding to the vehicle speed V. In the next Step S542, the control unit 7 reads the value of the angular velocity $\omega$ of the steering angle detected by the angular velocity detecting unit 71b, and, in Step S543, determines whether the value of the angular velocity $\omega$ is less than the set angular velocity value $\omega_s$, or not. If the value of the angular velocity $\omega$ is less than $\omega_s$, then the control unit 7 determines that the vehicle keeps straight on, and in Step S55, counts the rounds of allowing the angular velocity $\omega$ to remain being less than the set angular velocity $\omega_s$. Then, in Step S56, the control unit 7 reads the rotational position of the motor 8 when the counting operation is under way. Then, in Step S57, the control unit 7 adds the rotational position of the motor 8 to the sum of the rotational positions up to the last round, and calculates the middle point of the steering angle by dividing the result of the above addition by the counted rounds in order to replace the value of the middle point of the steering angle. If the vehicle speed V is lower than the threshold value $V_{s2}$ or the torque T is greater than the set torque value $T_{s2}$ or the angular velocity $\omega$ were faster than the set angular velocity $\omega_s$ in the course of Step S51, operational mode returns. As a result, when the torque T becomes 0 while the driver's hands leave the steering wheel to allow the steering wheel to return to the original position, the control unit 7 does not determine this to be the straight run of the vehicle, thereby, the time needed for calculating the middle point of the steering angle being lessened.

The control unit 7 executes the return control based on the routine for determining the left and right positions shown below until the calculation of the middle point of the steering angle is fully completed.

Figure 10:
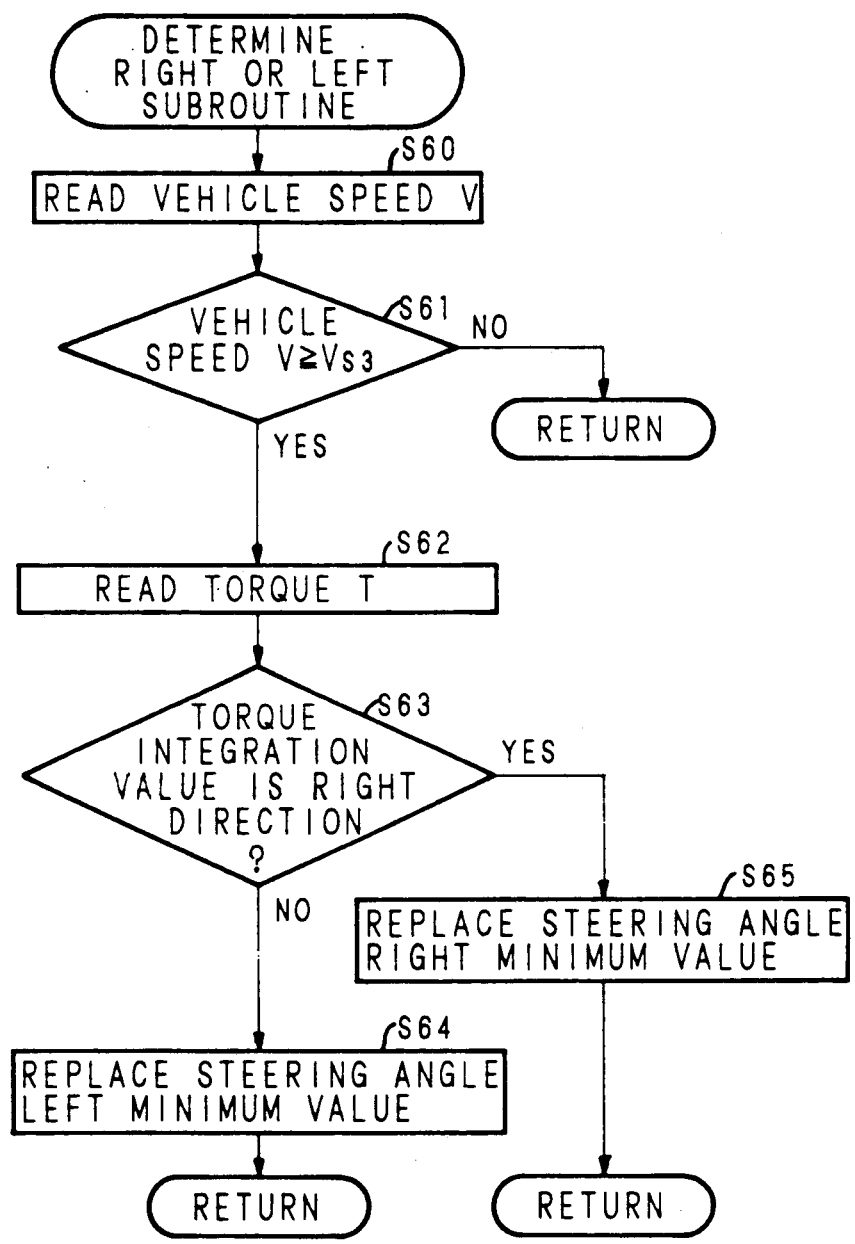
FIG. 10 presents the flow chart designating the process for determining the left and right positions of the steering wheel.

FIG. 10 presents the flow chart designating the routine for determining the right and left positions of the steering wheel. In this routine, the following steps are executed. First, in Step S60, the control unit 7 reads the vehicle speed V and in Step S61, determines whether the vehicle speed V is faster than the threshold value $V_{s3}$, or not. If the vehicle speed V is faster, in Step S62, the control unit 7 reads the torque T, and then integrates the torque T in the following Step S63 in order to determine whether the integrated value is in the right direction, or not. If so, in Step S65, the control unit 7 renews the value of the right position of the minimum steering angle value. If the integrated value is in the left direction, the control unit 7 renews the value of the left position of the minimum steering angle value in Step S64, and then the operational mode returns. Using these minimum values and the vehicle speed V, the control unit 7 determines the value of variable current Ia.

Next, operation for controlling the angular velocity of the steering wheel is described below.

The angular velocity detecting unit 71b reads the rotational position of the motor 8 from the rotary detector 17, calculates the steering angle, calculates the angular velocity $\omega$ by executing timewise differentiation of the calculated steering angle, and delivers the calculated angular velocity to the subtraction current functional unit 73c. The subtraction current functional unit 73c calculates the value of the subtraction current Ir in correspondence with the relationship between the inputted angular velocity $\omega$ and the vehicle speed V. The subtraction current Ir increments as the angular velocity $\omega$ increments, and, the value of the subtraction current Ir corresponding to the angular velocity $\omega$ increments in accordance with the acceleration of the vehicle speed V. The subtraction current functional unit 73c delivers the value of the subtraction current Ir calculated based on the above relationship to the subtractor 74b, which then subtracts the subtraction current Ir from the indicator current I. As a result, while the vehicle runs at a fast speed and the angular velocity is high, namely when quickly operating the steering wheel the amount of the subtraction current Ir increases compared to the low speed running of the vehicle, and, the amount of the indicator current I is held low, thereby, reeling sense of the vehicle at a high speed running being suppressed, and in addition, excessive return of the steering wheel can be prevented during the return movement of the steering wheel.

Next, the second embodiment of the invention is described below. In order to eliminate reeling sense of the steering operation when substantial amount of steering assisting force is applied while driving the vehicle at a fast speed and also eliminate sense of awkward steering operation caused by inertia of the steering assisting motor, the power steering apparatus of the preceding embodiment performs control operation to decrease the steering assisting force by subtracting the value corresponding to the angular velocity of the steering wheel rotation and the vehicle speed from the target value of the driving current flowing through the motor. As a result, the reeling and awkward sense during the steering operation is suppressed.

The control system of the preceding embodiment uniformly diminishes output torque composed of the input torque to be provided for the steering wheel being added with the steering assisting force, regardless of the amount of the input torque. In other words, the preceding control operation increases the input torque needed for gaining the predetermined output torque.

Nevertheless, in operating the power steering apparatus of the above embodiment, since the steering assisting force is not added to the input torque in the dead zone, the values of the input torque and output torque are equal to each other and, since the steering assisting force is added to the input torque outside of the dead zone, the ratio of the output torque against the input torque is higher than that in the dead zone. Accordingly, when the control operation of the above embodiment is executed, incremental amount of the input torque needed for gaining the predetermined output torque in the case that the input torque is outside of the dead zone is less than that in the case that it is in the dead zone. In this way, since the incremental amount of the input torque in and out of the dead zone differs from each other, the damping effect generated by the above control operation becomes intermittent, thus generating sense of discontinuity during the steering operation. To prevent damping effect from intermittent, the power steering apparatus of the second embodiment subtracts the detected torque value, too.

Next, control operation of the control unit 7 of the second embodiment of the invention is described below.

Figure 11:
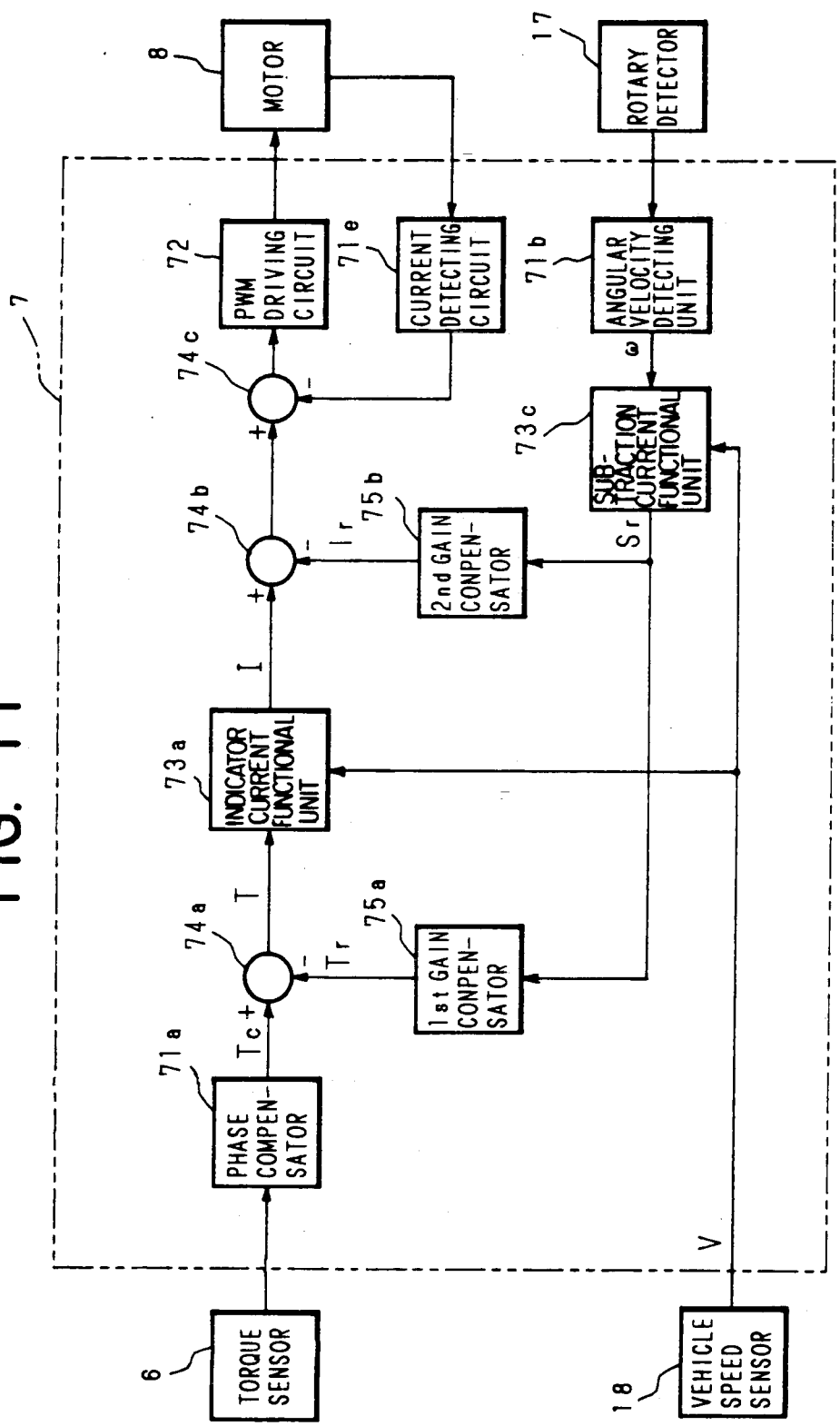
FIG. 11 illustrates the schematic block diagram designating the structure and operation of the control unit of the power steering apparatus reflecting another embodiment of the invention.

FIG. 11 illustrates the schematic block diagram designating the structure and the operation of the control unit 7 according to the second embodiment of the invention.

Phase compensator 71a for stabilizing the control system advances the phase of torque detecting signal after receiving it from the torque sensor 6. The phase compensated torque detecting signal is then delivered to the subtractor 74a as compensation detecting torque signal $T_c$. Vehicle speed detecting signal output from the vehicle speed sensor 18 is transmitted to the indicator current functional unit 73a which generates indicator current I for delivery to the motor 8. The vehicle speed detecting signal from the vehicle speed sensor 18 is also transmitted to the subtraction signal functional unit 73c which generates subtraction signal $S_r$ for subtracting the values of the torque detecting signal and indicator current I. Rotation detecting signal from the rotary detector 17 is transmitted to the angular velocity detecting unit 71b, which then differentiates the rotation detecting signal. The result of differentiation is delivered to the subtraction signal functional unit 73c as the angular velocity $\omega$.

The subtraction-signal functional unit 73c functionally processes the relationship between the angular velocity $\omega$ and the subtraction signal $S_r$ based on the value of the vehicle speed V. The value of the subtraction signal $S_r$ is calculated based on the angular velocity $\omega$ and the vehicle speed V, and then the subtraction signal $S_r$ is transmitted to first and second gain compensators 75a and 75b. The first gain compensator 75a calculates subtraction torque $T_r$ which subtracts the input subtraction signal $S_r$ from the compensation detecting torque $T_c$ by multiplying the input subtraction signal $S_r$ by the predetermined times. The result of this multiplication is delivered to the subtractor 74a.

The subtractor 74a subtracts the subtraction torque $T_r$ from the input compensation detecting torque $T_c$, and then, the result of this subtraction is delivered to the indicator current functional unit 73a as the input torque T. The indicator current functional unit 73a functionally processes the relationship between the input torque T and the indicator current I based on the value of the vehicle speed V. The value of the indicator current I is calculated based on the input torque T and the vehicle speed V, and then the indicator current I is delivered to the subtractor 74b.

The second gain compensator 75b calculates the subtraction current Ir which subtracts the input subtraction signal $S_r$ from the indicator current I by multiplying the input subtraction signal $S_r$ by the predetermined times. The result of this subtraction is delivered to the subtractor 74b. The subtractor 74b subtracts the subtraction current Ir from the input indicator current I, and then delivers the result to the subtractor 74c.

The subtractor 74c subtracts feedback signal outputted from the current detecting circuit 71e which has a current detecting resistor (not shown) inserted into the line of the motor 8 and detects the current consumed by the motor 8 from the result of the above subtraction. Then, the result of this subtraction is delivered to the motor 8 via the PWM driving circuit 72a. The current detecting circuit 71e is so constructed to detect current including flywheel current of the motor 8, thus stabilizing the current loop.

Figure 12:
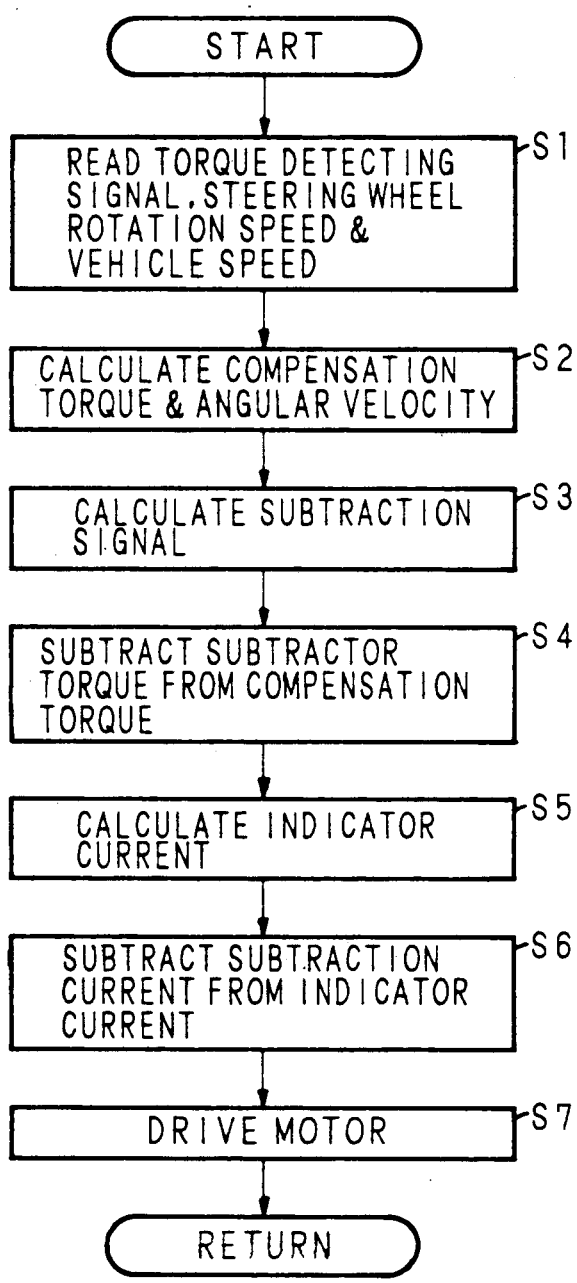
FIG. 12 presents the flow chart designating the control process of another embodiment for decreasing the steering assisting force in correspondence with the vehicle speed and the angular speed of the steering wheel.

Next, functional operation is described below. FIG. 12 presents the flow chart designating the control routine for decreasing steering assisting force in correspondence with the vehicle speed and the angular velocity of the steering wheel.

First, in Step S1, the control unit 7 reads torque detecting signal, rotation speed of the steering wheel, and the vehicle speed V, from the torque sensor 6, rotary detector 17, and the vehicle speed sensor 18, respectively.

Then, in Step S2, the phase compensator 71a converts the torque detecting signal into compensation detecting torque $T_c$, and simultaneously, the angular velocity detecting unit 71b calculates the angular velocity $\omega$ based on the rotation speed of the steering wheel.

Next, in Step S3, the subtraction signal functional unit 73c calculates the subtraction signal $S_r$ based on the input vehicle speed V and angular velocity $\omega$, and then the subtraction signal $S_r$ is transmitted to the first and second gain compensators 75a and 75b.

Figure 13:
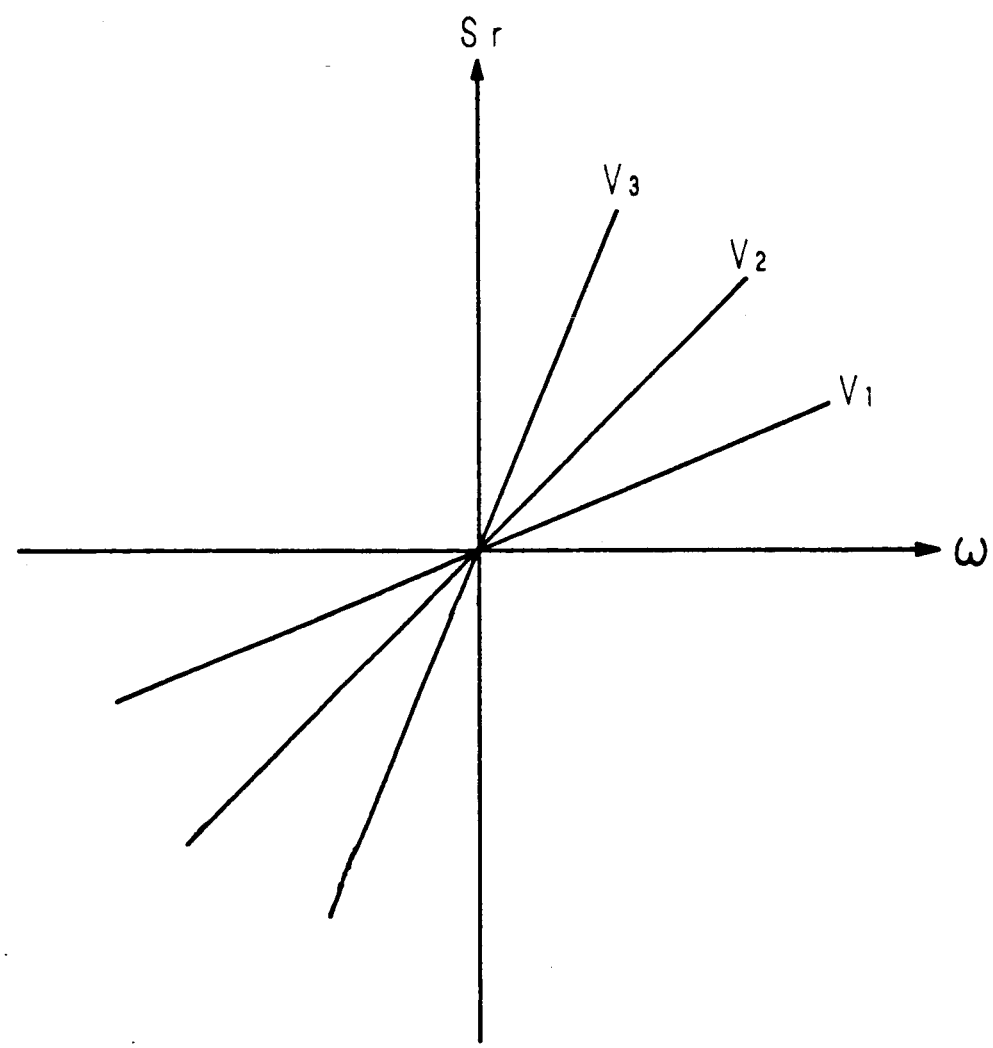
FIG. 13 presents graphic chart designating characteristic of the relationship between subtraction signal of subtraction signal functional unit and the steering angular velocity reflecting another embodiment of the invention.

FIG. 13 presents graphic chart designating characteristic of the relationship between the subtraction signal $S_r$ and the angular velocity $\omega$ in the subtraction signal functional unit 73c. In proportion to the increase of the angular velocity $\omega$, the value of the subtraction signal $S_r$ also increments, where the proportional relationship is dependent on the vehicle speed $V_1, V_2, V_3 \ldots$ (where $V_1 < V_2 < V_3$). The faster the vehicle speed V is, the greater the proportion of the substraction signal $S_r$ against the input angular velocity $\omega$ is. As a result, the faster the vehicle speed V and the angular velocity $\omega$ are, the greater the value of the subtraction signal $S_r$ is. While Step S3 is under way, the first gain compensator 75a calculates the subtraction torque $T_r$ by multiplying the subtraction signal $S_r$ by the predetermined times. Likewise, the second gain compensator 75b calculates the subtraction current Ir by multiplying the subtraction signal $S_r$ by the predetermined times.

Next, in Step S4, the subtractor 74a subtracts the subtraction torque $T_r$ from the compensation detecting torque $T_c$ to determine the input torque T.

Next, in Step S5, the indicator current functional unit 73a generates the indicator current I for delivery to the motor 8 based on the input torque T and vehicle speed V. The method of determining the indicator current I is shown in FIG. 14.

Figure 14:
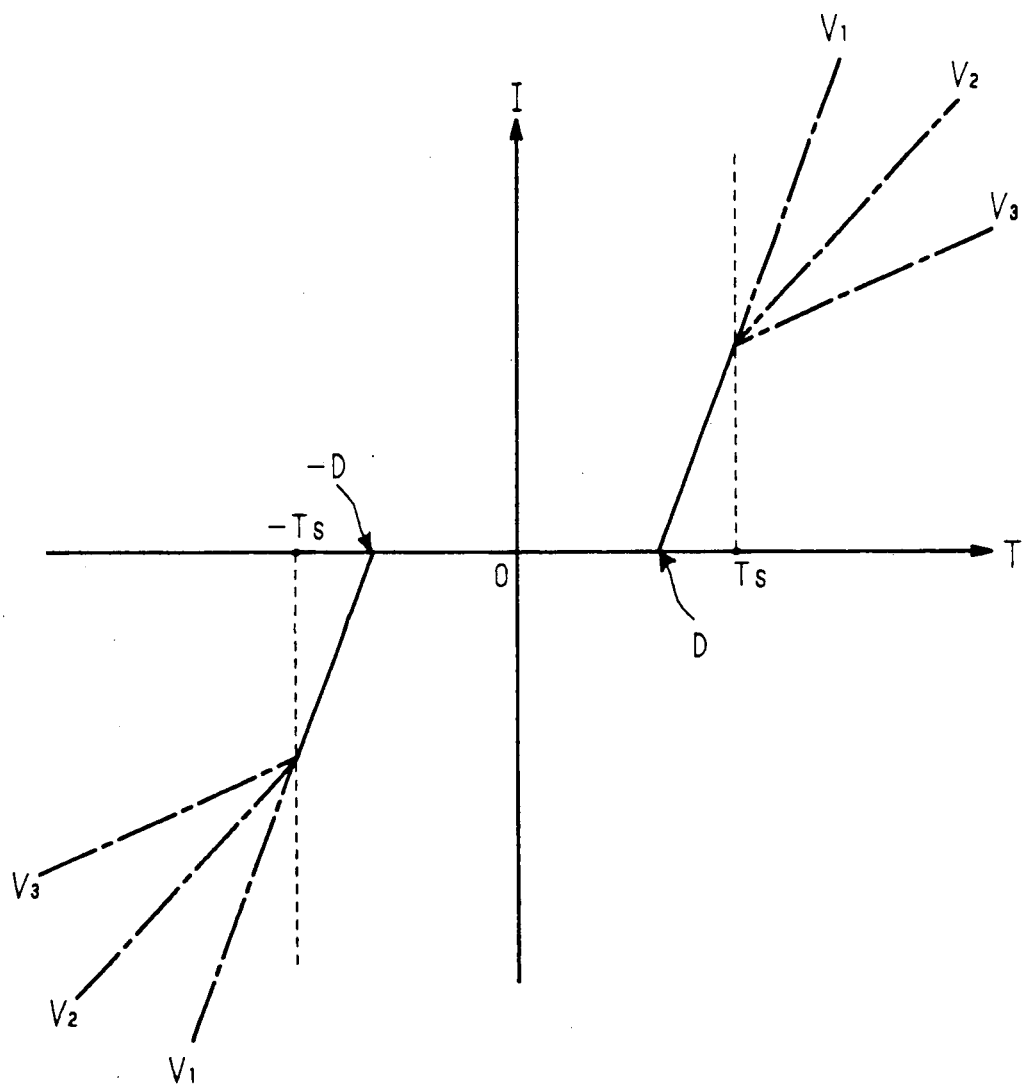
FIG. 14 presents graphic chart designating characteristic of the relationship between indicator current of indicator current functional unit and the input torque reflecting another embodiment of the invention.

FIG. 14 presents graphic chart designating characteristic of the relationship between the indicator current I and the input torque T in the indicator current functional unit 73a. The ordinate axis designates the indicator current I, and the abscissa axis designates the input torque T. The positive side of the input torque T along the abscissa axis designates the input torque T when turning the steering wheel to the right. The negative side of the input torque T along the abscissa axis designates the input torque T when turning the steering wheel to the left. The positive side of the indicator current I along the ordinate axis designates the current allowing the motor 8 to rotate in the direction of steering the vehicle to the right. The negative side of the indicator current I along the ordinate axis designates the current allowing the motor 8 to rotate in the direction of steering the vehicle to the left. One-dot chained line designates the above characteristic variable by the vehicle speed $V_1, V_2, V_3$.

The area between reference characters $-D$ and $D$ designate the dead zone. In the course of the steering operation, if the input torque T for performing the steering to the right or to the left exceeds the range of the dead zone $-D$ through D, then the amount of the indicator current I following through the motor 8 increases as the input torque T increases. As a result, the steering assisting force from the motor 8 is strengthened. In this case, until the input torque T reaches the predetermined low torque values $-T_s$ through $T_s$, the amount of the indicator current I increases independent of the vehicle speed V. When the input torque T exceeds the predetermined low torque values $-T_s$ through $T_s$, the relationship between the input torque T and the indicator current I is dependent on the vehicle speed $V_1, V_2, V_3$ (where $V_1 < V_2 < V_3$). As the vehicle speed V becomes faster, the amount of the indicator current I relative to the input torque T diminishes.

Next, in Step S6, the subtractor 74b subtracts the subtraction current Ir from the indicator current I. Then, in Step S7, the motor 8 is driven by the indicator current I freed from the substraction current Ir. When the input torque T in the indicator current functional unit 73a remains in the dead zone, subtraction of the subtraction current Ir from the indicator current I more effectively increases the incremental amount of steering torque than in the case in which the input torque T is cut of the dead zone. This is because there is substantial effect of subtracting the indicator current I, since no steering assisting operation is performed in the dead zone, and, when the input torque T is in the dead zone, the ratio of the output torque actually delivered to the steering apparatus against the input torque T generated by the steering operation is smaller, compared with the ratio when the input torque T is out of the dead zone. Nevertheless, the effect of subtraction in the dead zone is greater than that is available outside of the dead zone by simply executing subtraction of the indicator current I, and the driver feels sense of discontinuity on the way of steering operation. To prevent this, the subtractor 74b subtracts the substraction torque $T_r$ from the compensation detecting torque $T_c$ in the upstream of the indicator current functional unit 73a to promote the effect of subtraction outside of the dead zone and increase the incremental amount of the steering torque. This operation is executed based on the reasons shown below. If the compensation detecting torque $T_c$ is substracted before generation of the indicator current I, there is no effect of subtraction against the indicator current I because no indicator current is present when the input torque T in the dead zone, whereas there is substantial effect of subtraction against the indicator current I only when the input torque T is present outside of the dead zone.

As mentioned above, only when the input torque T is inside of the dead zone, the subtraction current Ir effectively works against the increase of the steering torque. Conversely, the subtraction torque $T_r$ effectively works only when the input torque T is out of the dead zone. As a result, it is possible for the second embodiment of the invention to eliminate sense of discontinuity due to the subtraction control over the output torque while driving the vehicle at a fast speed by properly adjusting gains of the first and second gain compensators 75a and 75b.

Next, the third embodiment of the invention is described below. In order to prevent the sense of discontinuity from occurrence in the damping effect in and out of the dead zone, the second embodiment aims at suppressing the sense of discontinuity in the course of the steering operation by subtracting the values which are individually predetermined so that the subtractable values can be increased in correspondence with the increase of the angular velocity and the vehicle speed from the torque detecting value to be delivered to the steering wheel and the target value of the steering assisting motor current.

Nevertheless, as mentioned earlier, by applying only the control method of subtracting the individually predetermined values from the torque detecting value and the target value of motor driving current in correspondence with the vehicle speed and the angular velocity, although substantial amount of subtraction can be yielded when quickly operating the steering wheel while driving the vehicle at a fast speed, only a small amount of subtraction can be yielded when operating the steering wheel by finely adjusting the steering angle. And as a result, driver feels somewhat light sense in the steering operation while driving his vehicle at a fast speed, and this in turn lowers the steering stability.

To prevent this, the third embodiment provides sense of false dynamic friction by increasing the value subtractable from the steering torque detecting value and the target value of the motor current in correspondence with the vehicle speed V whenever the angular velocity exceeds the predetermined value.

Next, operational features of the third embodiment of the invention is described below.

Figure 15:
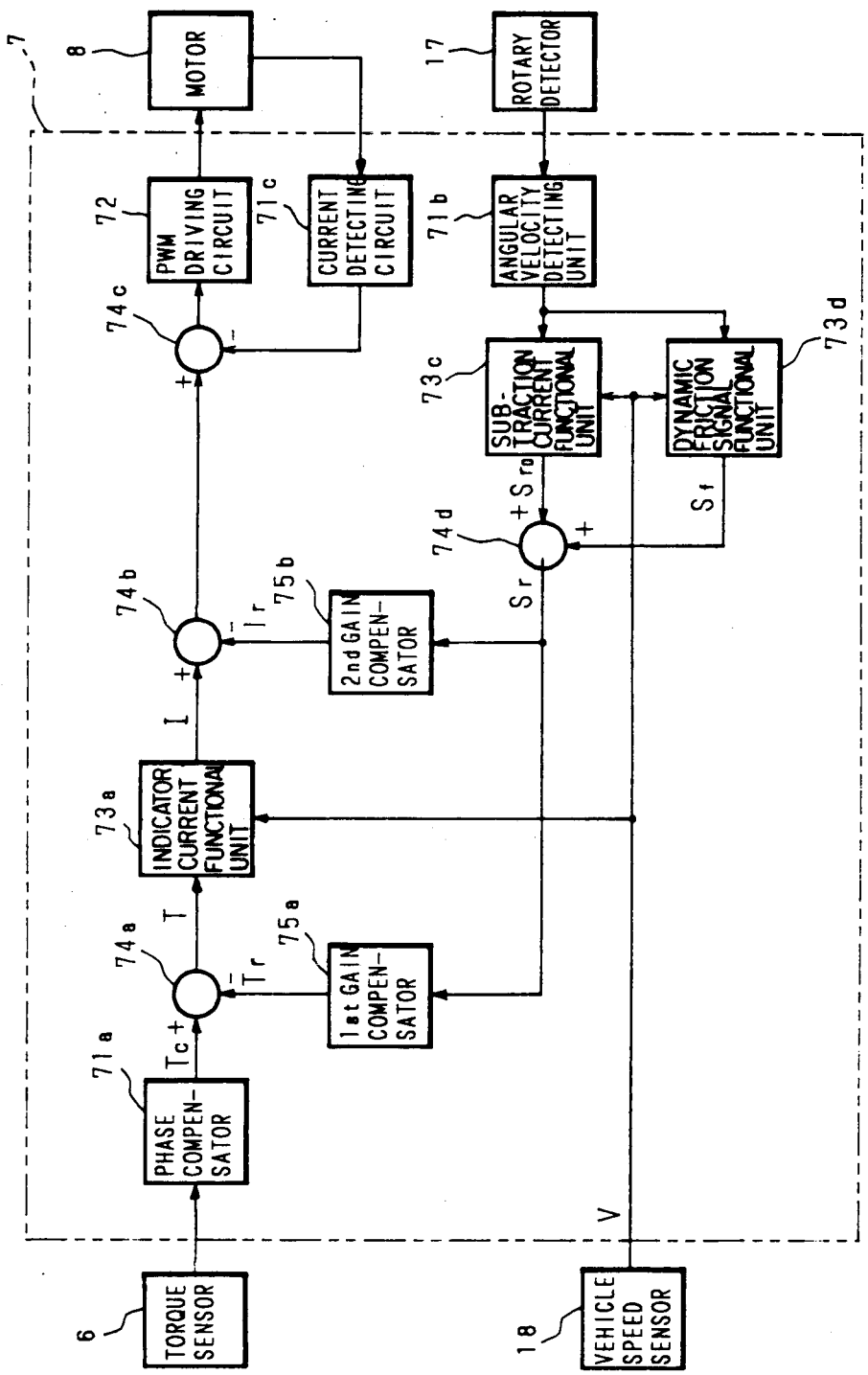
FIG. 15 illustrates the schematic block diagram designating the structure and operation of the control unit of the power steering apparatus reflecting a still further embodiment of the invention.

FIG. 15 illustrates the schematic block diagram designating the structure and control operation of the power steering apparatus according to the third embodiment of the invention.

Torque detecting signal outputted from the torque sensor 6 is delivered to the phase compensator 71a which advances the phase of this signal and stabilizes the system operation. After completing phase compensation in the phase compensator 71a, the phase compensated torque detecting signal is transmitted to the subtractor 74a as the compensation-detecting torque $T_c$. The vehicle speed detecting signal from the vehicle speed sensor 18 is transmitted to the indicator current functional unit 73a generating the indicator current I for delivery to the motor 8 (this operation is described later on), substraction-signal functional unit 73c generating original subtraction signal $S_{r0}$ which is to be subtracted from the values of the torque detecting signal and the indicator current I, and dynamic friction signal function unit 73d generating dynamic friction signal $S_f$ which is to be added to the original subtraction signal $S_{r0}$. Rotation detecting signal outputted from the rotary detector 17 is transmitted to the angular velocity detecting unit 71b. The rotation detecting signal is then differentiated by the angular velocity detecting unit 71b, and then transmitted to the subtraction signal functional unit 73c and the dynamic friction signal functional unit 73d as the steering angular velocity $\omega$.

The subtraction signal functional unit 73c functionally processes the relationship between the steering angular velocity $\omega$ and the original subtraction signal $S_{r0}$ in correspondence with the value of the vehicle speed V. The original subtraction signal $S_{r0}$ is calculated based on the angular velocity $\omega$ and the vehicle speed V and transmitted to the adder 74d. The dynamic friction signal functional unit 73d functionally processes the relationship between the angular velocity $\omega$ and the dynamic friction signal $S_f$ in correspondence with the value of the vehicle speed V. The dynamic friction signal $S_f$ is calculated based on the angular velocity $\omega$ and the vehicle speed V for delivery to the adder 74d.

The adder 74d adds the dynamic friction signal $S_f$ to the input original subtraction signal $S_{r0}$, and then, the sum is delivered to the first and second gain compensator 75a and 75b as the subtraction signal $S_r$. The first gain compensator 75a calculates the value of the subtraction torque T which is subtracted from the compensation detecting torque $T_c$ by multiplying the input subtraction signal $S_r$ by the predetermined times, and then, the resultant subtraction torque $T_r$ is delivered to the subtractor 74a.

The subtractor 74a subtracts the subtraction torque $T_r$ from the input compensation detecting torque $T_c$, and then the result of this subtraction is delivered to the indicator current functional unit 73a. In the indicator current functional unit 73a, the relationship between the input torque T and the indicator current I is functionally processed based on the value of the vehicle speed V, and the value of the indicator current I is determined based on the input torque T and the vehicle speed V and delivered to the subtractor 74b.

The second gain compensator 75b calculates the value of the subtraction current Ir to be subtracted from the indicator current I by multiplying the input subtraction signal $S_r$ by the predetermined times. The result of this calculation is also delivered to the subtractor 74b.

The subtractor 74b subtracts the subtraction current $I_r$ from the input indicator current I, and then the subtracted result is delivered to subtractor 74c. The subtraction unit 74c subtracts feedback signal which is outputted from the current detecting circuit 71e which has a current detecting resister (not shown) inserted into the line of the motor 8 and detects the current consumed by the motor 8 from the result of the above subtraction. The subtracted result is then delivered to the motor 8 via PWM driving circuit 72a. The current detecting circuit 71e is so constructed to detect current including flywheel current of the motor 8, thus stabilizing current loop.

Figure 16:
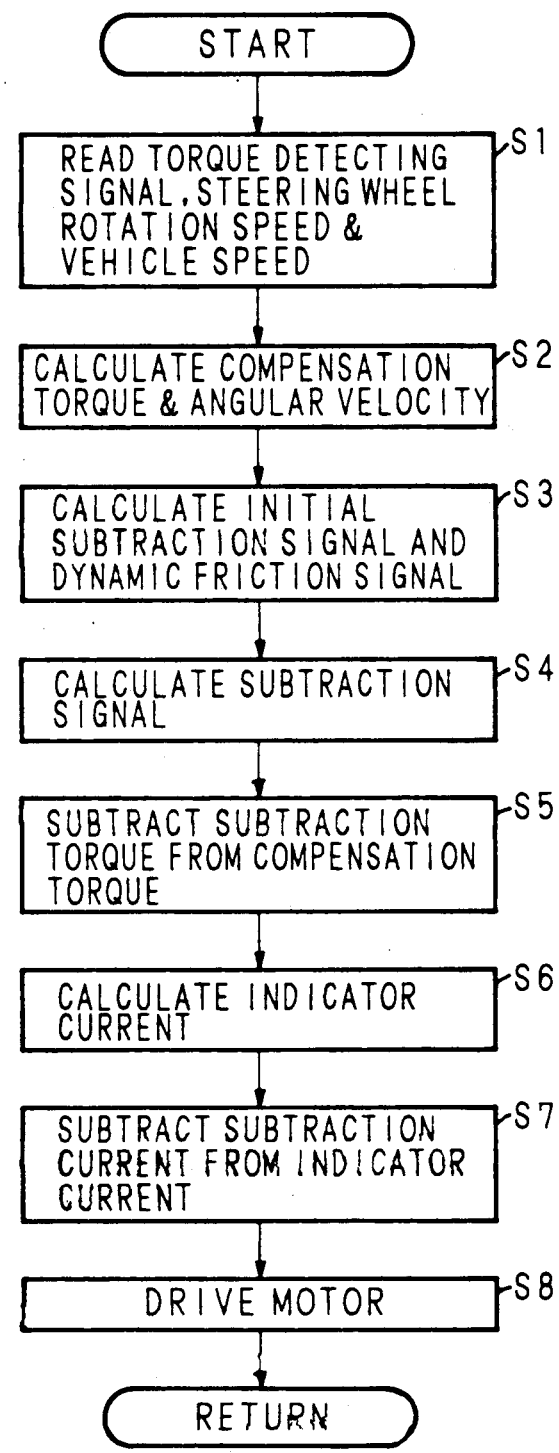
FIG. 16 presents the flow chart designating the control process for decreasing the steering force in correspondence with the vehicle speed and the angular velocity of the steering wheel.

Next, operational feature is described below. FIG. 16 presents the flow chart designating the control routine for diminishing the steering assisting force in correspondence with the vehicle speed V and the angular velocity of the steering wheel.

First, in Step S1, the control unit 7 reads the values of the torque detecting signal, rotation speed of the steering wheel, and the vehicle speed V from the torque sensor 6, rotary detector 17, and the vehicle speed sensor 18, respectively.

Then, in Step S2, the phase compensator 71a converts the torque detecting signal into compensation detecting torque $T_c$, whereas the angular velocity detecting unit 71b calculates the angular velocity $\omega$ of the rotating steering wheel.

Next, in Step S3, the subtraction signal functional unit 73c calculates the original subtraction signal $S_{r0}$ based on the input vehicle speed V and the angular velocity $\omega$, and then transmits the original subtraction signal $S_{r0}$ to the adder 74d. Simultaneously, the dynamic friction signal functional unit 73d calculates the dynamic friction signal $S_f$ based on the input vehicle speed V and the angular velocity $\omega$, and then delivers it to the adder 74d.

The relationship between the original subtraction signal $S_{r0}$ and the angular velocity $\omega$ is identical to the characteristic at the time of replacing the subtraction signal $S_r$ shown in FIG. 13 with the original subtraction signal $S_{r0}$.

Figure 17:
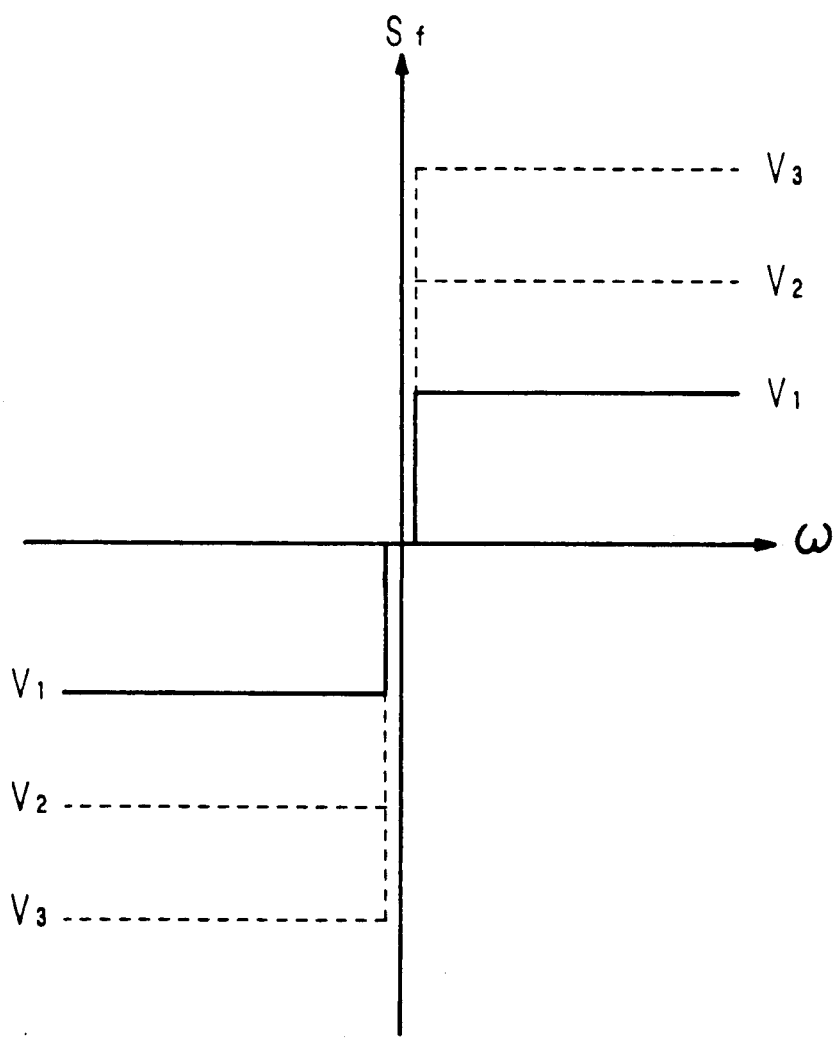
FIG. 17 presents graphic chart designating characteristic of the relationship between dynamic friction signal of dynamic friction signal functional unit and the steering angular velocity.

The method of determining the dynamic friction signal $S_f$ is shown in FIG. 17. FIG. 17 graphically presents characteristic of the relationship between the dynamic friction signal $S_f$ of the dynamic friction signal functional unit 73d and the angular velocity $\omega$. The ordinate axis designates the dynamic friction signal $S_f$, and the abscissa axis designates the angular velocity $\omega$. The positive side of the angular velocity $\omega$ along the abscissa axis designates the angular velocity when turning the steering wheel to the right. The negative side of the angular velocity $\omega$ along the abscissa axis designates the angular velocity $\omega$ when turning the steering wheel to the left. Broken lines designate the above mentioned characteristic variable by the vehicle speed $V_1$, $V_2$, $V_3$ (where $V_1 < V_2 < V_3$). The dynamic friction signal functional unit 73d detects that the steering wheel is finely operated by means of the angular velocity $\omega$, and then, when the angular velocity $\omega$ exceeds the predetermined value, the dynamic friction signal functional unit 73d outputs the predetermined constant dynamic friction signal $S_f$. As the vehicle speed $V_1$, $V_2$, $V_3$ accelerates, the dynamic friction signal $S_f$ outputs greater values. Since the dynamic friction signal $S_f$ is uniformly outputted in all operating range from extremely fine steering to very quick steering operation, it is delivered to the steering wheel as false dynamic friction force while driving the vehicle. In particular, since the dynamic friction signal $S_f$ is extremely effective while driving the vehicle at a fast speed, it securely provides the driver with "heavy" steering sense when finely operating the steering wheel, thus effectively stabilizing the steering operation.

Next, in Step S4, the adder 74d adds the dynamic friction signal $S_f$ to the original subtraction signal $S_{r0}$, and then delivers the sum to the first and second gain compensators 75a and 75b as the subtraction signal $S_r$. The first gain compensator 75a calculates the subtraction torque $T_r$ by multiplying the subtraction signal $S_r$ by the predetermined times. On the other hand, the second gain compensator 75b calculates the subtraction current Ir by multiplying the subtraction signal $S_r$ by the predetermined times.

Next, in Step S5, the subtractor 74a subtracts the subtraction torque $T_r$ from the compensation detecting torque $T_c$ in order to calculate the input torque T.

Then, in Step S6, the indicator current functional unit 73a generates the indicator current I for delivery to the motor 8 based on the input torque T and the vehicle speed V. The value of the indicator current I is determined by applying the method identical to that is shown in FIG. 14.

Next, in Step S7, the subtractor 74b subtracts the subtraction current Ir from the indicator current I. Finally, in Step S8, the motor 8 is driven by means of the indicator current I generated as a result of the subtraction executed in Step S7. Compared to the case in which the input torque T is out of the dead zone in the indicator current functional unit 73a, subtraction of the subtraction current Ir from the indicator current I when the input torque is in the dead zone, provides greater effect for increasing the incremental amount of the steering torque. This is because the effect of subtracting the indicator current I is quite substantial, since no steering assisting force is provided in the dead zone, and the ratio of the output torque actually delivered to the steering apparatus against the input torque generated by the operation of the steering wheel is less than that is available outside of the dead zone. Nevertheless, if only the indicator current I is subtracted, the effect of subtraction in the dead zone becomes greater than that is available outside of the dead zone, thus causing the driver to feel the sense of discontinuity while operating the steering wheel. To eliminate this, the third embodiment promotes incremental amount of steering torque by strengthening the effect of subtraction outside of the dead zone by subtracting the subtraction torque $T_r$ from the compensation detecting torque $T_c$ at the upstream side of the indicator current functional unit 73a.

This is because, if the compensation detecting torque $T_c$ is diminished before generating the indicator current I, no effect of subtraction is applied to the indicator current I, since there is no indicator current I at all in the case where the input torque T is in the dead zone, but the effect of subtraction is generated only when the input torque T is out of the dead zone.

As mentioned above, only when the input torque T is in the dead zone, the subtraction current Ir effectively works against the increase of the steering torque. Conversely, as the subtraction torque $T_c$ effectively works only when the input torque is out of the dead zone, by properly adjusting the gains of the first and second gain compensators 75a and 75b, the power steering apparatus can effectively suppress the sense of discontinuity while performing subtraction control of the output torque in the course of driving the vehicle at a high speed.

In order to provide the sense of dynamic friction, the third embodiment allows the values of the subtraction torque T and the subtraction current Ir to increment in correspondence with the vehicle speed V when the angular velocity $\omega$ exceeds the predetermined value. However, the third embodiment also allows either of the subtraction torque $T_r$ or the subtraction current I to increase as well.

As is clear from the above description, according to the third embodiment of the invention, the values which are to be subtracted respectively from the torque detecting value to be delivered to the steering wheel and the target value of the steering assisting motor current in correspondence with the steering angular velocity and the vehicle speed are increased in correspondence with the vehicle speed if the angular velocity exceeds the predetermined value, so that false dynamic friction force can constantly be delivered to the steering wheel. As a result, the power steering apparatus embodied by the invention provides extremely stable steering performance when the driver finely operates the steering wheel while the vehicle runs at a fast speed. By virtue of extremely stable steering characteristic materialized by the invention, adjustable range for the steering sense expands so that the driver can enjoy natural and stable steering sense.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. A motor-driven power steering apparatus for a vehicle comprising:
  a steering mechanism which converts rotation of a steering wheel into rotary movement in the left and right directions for steering;
  steering angular velocity detecting means for detecting steering angular velocity of said steering mechanism;
  torque detecting means for detecting steering torque applied to said steering wheel;
  a motor for assisting steering operation;
  vehicle speed detecting means for detecting vehicle speed;
  first current value setting means for setting first current value in correspondence with the steering torque detected by said torque detecting means and the vehicle speed detected by said vehicle speed detecting means;
  second current value setting means for setting second current value in correspondence with the vehicle speed detected by said vehicle speed detecting means and the steering angular velocity detected by said steering angular velocity detecting means;

first subtraction means for subtracting said second current value from said first current value; and driving means for driving said motor based on the result of subtraction executed by said first subtraction means.

2. The motor-driven power steering apparatus as set forth in claim 1, wherein said steering angular velocity detecting means has rotation speed detecting means secured to the rotary shaft of said motor.

3. The motor-driven power steering apparatus as set forth in claim 1, wherein, when detected steering torque value is less than a predetermined value, said first current value setting means sets the first current value corresponding to the detected torque irrespective of the detected vehicle speed.

4. The motor-driven power steering apparatus as set forth in claim 1, wherein, when the detected steering torque value is in excess of a predetermined value, said first current value setting means sets the first current value which increases as the detected steering torque increases.

5. The motor-driven power steering apparatus as set forth in claim 4, wherein, when the detected steering torque value is in excess of a predetermined value, said first current value setting means reduces the increase rate of the first current value against said steering torque as the detected vehicle speed increases.

6. The motor-driven power steering apparatus as set forth in claim 1, wherein said second current value setting means sets the second current value which increases as the detected steering angular velocity increases.

7. The motor-driven power steering apparatus as set forth in claim 6, wherein said second current value setting means raises the increase rate of the second current value against said steering angular velocity as the detected vehicle speed increases.

8. The motor-driven power steering apparatus as set forth in claim 1, further comprising:

torque value setting means for setting torque value in correspondence with the detected vehicle speed and steering angular velocity; and second subtraction means for subtracting the torque value set by said torque value setting means from the detected steering torque value, said first current value setting means setting the first current value in accordance with the torque resulted from the subtraction executed by said second subtraction means and the vehicle speed detected by said vehicle speed detecting means.

9. The motor-driven power steering apparatus as set forth in claim 8, further comprising:

first addition means for adding a predetermined value corresponding to the detected vehicle speed to the second current value set by said second current value setting means, said first subtraction means subtracting the result of the addition executed by said first addition means from the set first current value.

10. The motor-driven power steering apparatus as set forth in claim 8, further comprising:

second addition means for adding a predetermined value corresponding to the detected vehicle speed to the torque value set by said torque value setting means, said second subtraction means subtracting the result of addition executed by said second addition means from the detected steering torque.

11. The motor-driven power steering apparatus as set forth in claim 9, further comprising:

second addition means for adding a predetermined value corresponding to the detected vehicle speed to the torque value set by said torque value setting means, said second subtraction means subtracting the result of the addition executed by said second addition means from the detected steering torque.

* * * * *

UNITED STATES PATENT AND TRADEMARK OFFICE
CERTIFICATE OF CORRECTION

PATENT NO. : 5,040,629

DATED : August 20, 1991

INVENTOR(S) : Matsuoka et al.

It is certified that error appears in the above-identified patent and that said Letters Patent is hereby corrected as shown below:

On the title page, Item [56]
in the References Cited Section on page 1
of the above patent under Foreign Patent
Documents there is one reference missing:

--2,161,770 A  1/1986  United Kingdom--

Signed and Sealed this

Sixteenth Day of February, 1993

*Attest:*

STEPHEN G. KUNIN

*Attesting Officer*     *Acting Commissioner of Patents and Trademarks*